US012602552B2

(12) United States Patent
Lamba et al.

(10) Patent No.: US 12,602,552 B2
(45) Date of Patent: Apr. 14, 2026

(54) MACHINE-LEARNING-BASED OKR GENERATION

(71) Applicant: Microsoft Technology Licensing, LLC, Redmond, WA (US)

(72) Inventors: Linsey Lamba, Seattle, WA (US); Hongmei Liu, Bellevue, WA (US); Aarushi Arora, Lucknow (IN); Balaji Seetharaman, Chennai (IN); Aakanksha Prithwi Raj, Bangalore (IN); Gokul Prasanth P, Tiruppur (IN); Jaiprakash Sekar, Chennai (IN); Prasanna Venkatesan, Chennai (IN); Rajesh K, Chennai (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 442 days.

(21) Appl. No.: 18/194,644

(22) Filed: Apr. 2, 2023

(65) Prior Publication Data

US 2024/0330602 A1 Oct. 3, 2024

(51) Int. Cl.
*G06F 40/47* (2020.01)
*G06F 40/253* (2020.01)
(Continued)

(52) U.S. Cl.
CPC ............ *G06F 40/47* (2020.01); *G06F 40/253* (2020.01); *G06F 40/55* (2020.01); *G06N 3/045* (2023.01);
(Continued)

(58) Field of Classification Search
None
See application file for complete search history.

(56) References Cited

U.S. PATENT DOCUMENTS 11,657,307 B1 * 5/2023 Bodapati ................ G06N 20/00 706/15
11,868,672 B1 * 1/2024 Dehkordi .............. G06F 40/169
(Continued)

OTHER PUBLICATIONS

Lanling Xu, Jianxun Lian, Wayne Xin Zhao, Ming Gong, Linjun Shou, Daxin Jiang, Xing Xie, Ji-Rong Wen; Negative Sampling for Contrastive Representation Learning: A Review; Jun. 1, 2022; URL: https://arxiv.org/abs/2206.00212 (Year: 2022).*
(Continued)

*Primary Examiner* — Richa Sonifrank
(74) *Attorney, Agent, or Firm* — Foley IP Law, PLLC

(57) ABSTRACT

A method for training a machine learning model using positive and negative synthetic data is implemented via a computing system including a processor. The method includes generating synthetic data using a generative pre-trained transformer bidirectional language model and self-supervising the generated synthetic data based on positive traits including rule-based criteria and/or model-based criteria. The method also includes generating a set of positive synthetic data labels with gradient scale rating based on the self-supervised synthetic data, synthesizing a set of negative synthetic data labels by self-supervising the positive synthetic data labels, and training a machine learning model using the set of positive synthetic data labels and the set of negative synthetic data labels. Another method further includes utilizing the trained machine learning model to generate Objectives and Key Results (OKRs) within the context of an enterprise application.

20 Claims, 12 Drawing Sheets

(51) Int. Cl.
*G06F 40/55* (2020.01)
*G06N 3/045* (2023.01)
*G06N 3/0455* (2023.01)
*G06N 3/0895* (2023.01)

(52) U.S. Cl.
CPC ......... *G06N 3/0455* (2023.01); *G06N 3/0895* (2023.01)

(56) References Cited

U.S. PATENT DOCUMENTS

| | | | | |
|---|---|---|---|---|
| 2020/0312457 | A1 | 10/2020 | Kasthurirathne et al. | |
| 2022/0156593 | A1 * | 5/2022 | Liu | G06N 3/0895 |
| 2022/0383047 | A1 * | 12/2022 | Hwang | G06V 10/82 |
| 2023/0136527 | A1 * | 5/2023 | Zhang | G06F 40/35 704/9 |
| 2023/0169332 | A1 * | 6/2023 | Karthik | G06N 3/045 706/25 |
| 2024/0005099 | A1 * | 1/2024 | Dourban | G06N 20/00 |
| 2024/0265349 | A1 * | 8/2024 | Kaye | G06Q 10/105 |
| 2024/0420453 | A1 * | 12/2024 | Gupta | G06F 40/30 |
| 2025/0037798 | A1 * | 1/2025 | Ruffolo | G16B 35/10 |
| 2025/0174235 | A1 * | 5/2025 | Li | G10L 21/02 |

OTHER PUBLICATIONS

Betterworks; OKR writing assistant; May 27, 2022 (Year: 2022).*

"How OKRs Help Businesses Grow", Retrieved From: https://web.archive.org/web/20230119072606/https://adoption.microsoft.com/files/viva/goals/Viva-Goals-OKR-Examples.pdf, Jan. 19, 2023, 17 Pages.

"How To Write Effective Okrs With the Fitbots OKR Assistant", Retrieved From: https://web.archive.org/web/20221222123407/https://www.fitbots.com/blog/how-to-write-effective-okrs-with-the-fitbots-okr-assistant, Dec. 22, 2022, 8 Pages.

"OKR Generator", Retrieved From: https://web.archive.org/web/20221129153705/https://nichesss.com/tools/okr-generator-c55rCzTyz, Nov. 29, 2022, 5 Pages.

"OKR Writing Assistant", Retrieved From: https://web.archive.org/web/20220527133056/https://support.betterworks.com/hc/en-us/articles/4495948596365-OKR-Writing-Assistant, May 27, 2022, 2 Pages.

"Online Marketing KPIs", Retrieved From: https://web.archive.org/web/20220101000000*/https://www.sisense.com/kpis/online-marketing-kpis/, Aug. 19, 2022, 3 Pages.

"What Is Data Labeling For Machine Learning?", Retrieved From: https://web.archive.org/web/20211123072710/https://aws.amazon.com/sagemaker/data-labeling/what-is-data-labeling/, Nov. 23, 2021, 7 Pages.

Cuofano, Gennaro, "OKR Generator", Retrieved From: https://fourweekmba.com/okr-generator/, Jan. 9, 2023, 18 Pages.

Rogers, Sandy, "Automatically Generating Goal-Progress Interfaces from Natural Language Goal Statements, Using Dependency Parsing", Retrieved From: https://towardsdatascience.com/automatically-generating-goal-progress-interfaces-from-natural-language-goal-statements-using-2b601289a2b9, Feb. 7, 2018, 5 Pages.

Schuldt, Bryan, "Generate goals with AI", Retrieved From: https://blog.tability.io/tability-ai/, Dec. 7, 2022, 5 Pages.

Whitfield, Dewayne, "Using GPT-2 to Create Synthetic Data to Improve the Prediction Performance of NLP Machine Learning Classification Models", In repository of arXiv:2104.10658v1, Dec. 31, 2020, 10 Pages.

* cited by examiner

EXECUTE ENTERPRISE APPLICATION ON REMOTE COMPUTING SYSTEM VIA NETWORK ⌐102

CAUSE SURFACING OF USER INTERFACE ON DISPLAY OF REMOTE COMPUTING SYSTEM DURING EXECUTION OF ENTERPRISE APPLICATION, WHERE USER INTERFACE CORRESPONDS TO GOAL-SETTING FEATURE OF ENTERPRISE APPLICATION ⌐104

RECEIVE, VIA SURFACED USER INTERFACE, TEXT INPUT CORRESPONDING TO OBJECTIVE FOR OKR ⌐106

ASSESS TEXT INPUT BASED ON DESIRED OKR TRAITS USING MACHINE LEARNING MODEL ⌐108

CAUSE SURFACING OF USER INTERFACE ELEMENT ON USER INTERFACE, WHERE USER INTERFACE ELEMENT INCLUDES INDICATION OF WHETHER TEXT INPUT SATISFIES EACH OF DESIRED OKR TRAITS ⌐110

RECEIVE, VIA SURFACED USER INTERFACE, MODIFICATION TO TEXT INPUT ⌐112

ADAPT SURFACED USER INTERFACE ELEMENT TO UPDATE INDICATION OF WHETHER TEXT INPUT SATISFIES EACH OF DESIRED OKR TRAITS ⌐114

LOAD OKR INTO GOAL-SETTING FEATURE OF ENTERPRISE APPLICATION RESPONSIVE TO TEXT INPUT SATISFYING SPECIFIED PERCENTAGE OF OKR TRAITS ⌐116

100

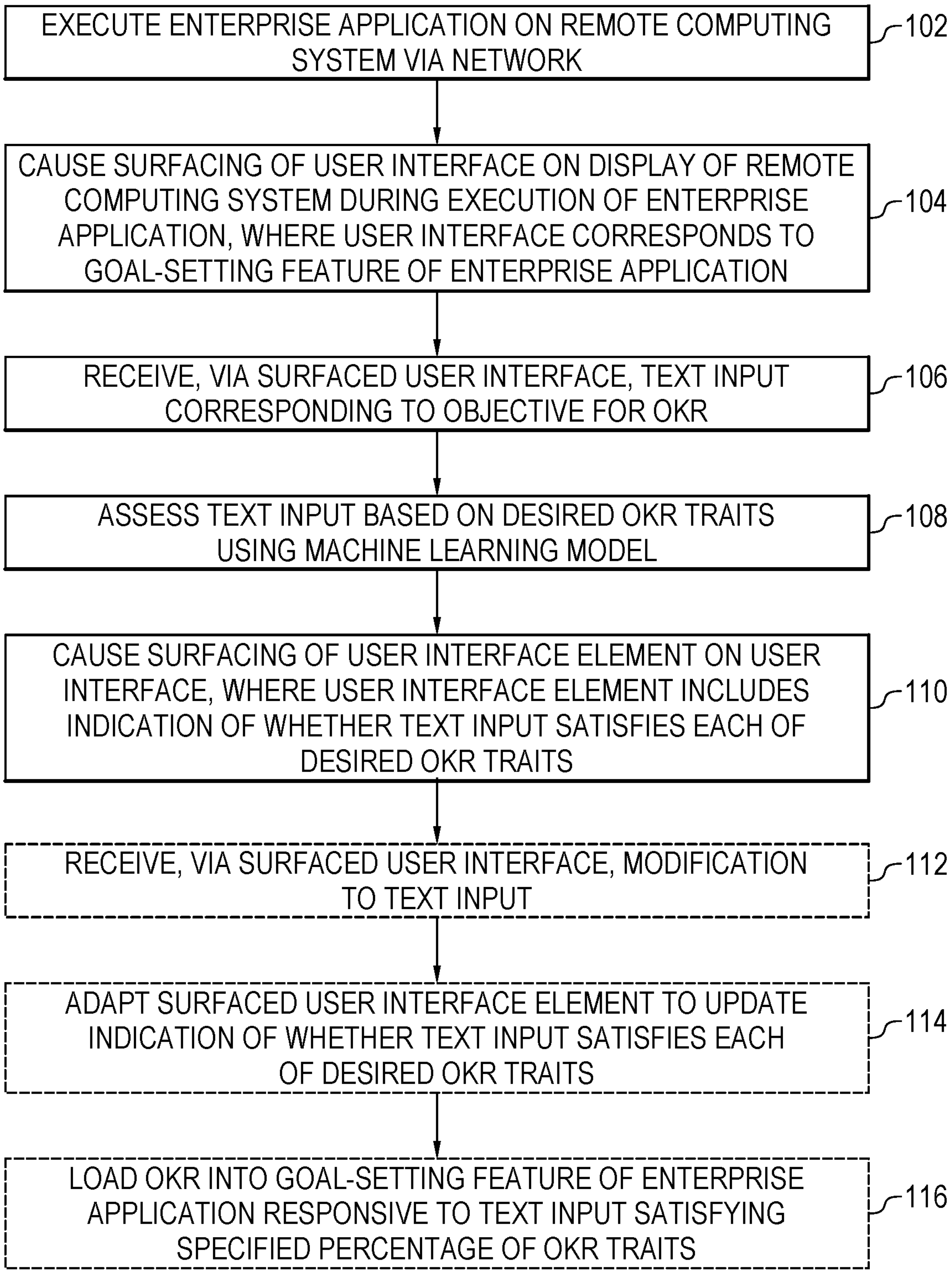

FIG. 1

GENERATIVE PRE-TRAINED TRANSFORMER
BIRECTIONAL LANGUAGE MODEL — 202

SELF-SUPERVISE GENERATED SYNTHETIC DATA BASED ON
POSITIVE TRAITS INCLUDING RULE-BASED CRITERIA
AND/OR MODEL-BASED CRITERIA — 204

GENERATE SET OF POSITIVE SYNTHETIC DATA LABELS
WITH GRADIENT SCALE RATING — 206

SYNTHESIZE SET OF NEGATIVE SYNTHETIC DATA LABELS
BY SELF-SUPERVISING POSITIVE SYNTHETIC DATA LABELS — 208

TRAIN MACHINE LEARNING MODEL USING SET OF POSITIVE
SYNTHETIC DATA LABELS AND SET OF NEGATIVE SYNTHETIC
DATA LABELS — 210

200

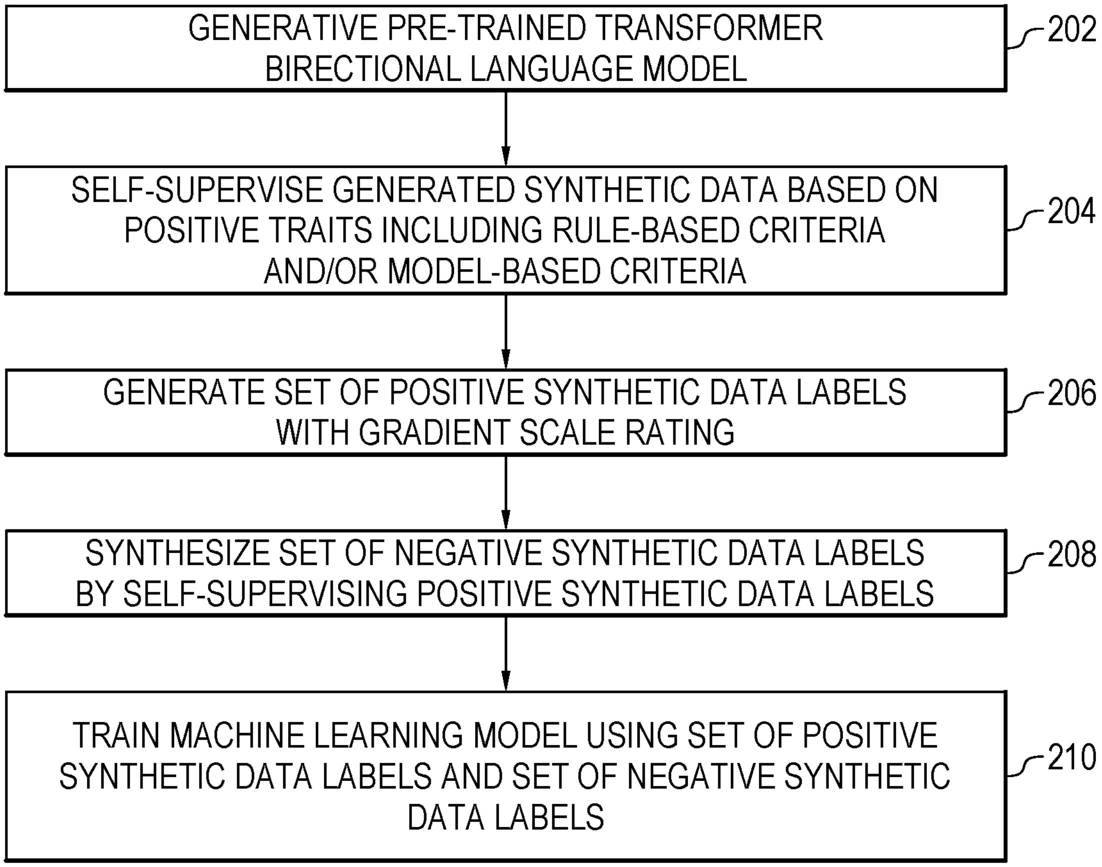

FIG. 2

MACHINE-LEARNING-BASED OKR GENERATION

BACKGROUND

The present disclosure generally relates to Objectives and Key Results (OKR) features provided by enterprise applications. More specifically, the present disclosure relates to the machine-learning-based generation of OKRs with respect to enterprise applications.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment, a method for training a machine learning model using positive and negative synthetic data generated, at least in part, using a generative pre-trained transformer bidirectional language model is described. The method is implemented via a computing system including a processor. The method includes generating synthetic data using a generative pre-trained transformer bidirectional language model and self-supervising the generated synthetic data based on positive traits including at least one of rule-based criteria or model-based criteria. The method also includes generating a set of positive synthetic data labels with a gradient scale rating based on the self-supervised synthetic data, synthesizing a set of negative synthetic data labels by self-supervising the positive synthetic data labels, and training a machine learning model using the set of positive synthetic data labels and the set of negative synthetic data labels.

In another embodiment described herein, a method for generating Objectives and Key Results (OKRs) within the context of an enterprise application using a machine learning model is provided. The method is implemented via a computing system including a processor. The method includes generating synthetic OKR data using a generative pre-trained transformer bidirectional language model, self-supervising the generated synthetic OKR data based on desired OKR traits, and generating a set of positive synthetic OKR data labels with a gradient scale rating. The method includes synthesizing a set of negative synthetic OKR data labels by self-supervising the positive synthetic OKR data labels and training a machine learning model using the set of positive synthetic OKR data labels and the set of negative synthetic OKR data labels. The method includes executing, via a network, an enterprise application on a remote computing system and causing the surfacing of a user interface on a display of the remote computing system during the execution of the enterprise application, where the user interface corresponds to a goal-setting feature of the enterprise application. The method also includes receiving, via the surfaced user interface, text input corresponding to an objective for an OKR and assessing the text input based on the desired OKR traits using the trained machine learning model. The method further includes causing the surfacing of a user interface element on the user interface, where the user interface element includes an indication of whether the text input satisfies each of the desired OKR traits.

In another embodiment, an application service provider server is described. The application service provider server includes a processor, an enterprise application that is utilized by an enterprise, and a communication connection for connecting a remote computing system to the application service provider server via a network, where the remote computing system is operated by an enterprise user corresponding to the enterprise. The application service provider server also includes a computer-readable storage medium operatively coupled to the processor. The computer-readable storage medium includes computer-executable instructions that, when executed by the processor, cause the processor to: (a) generate synthetic OKR data using a generative pre-trained transformer bidirectional language model; (b) self-supervise the generated synthetic OKR data based on desired OKR traits including at least one of rule-based criteria or model-based criteria; (c) generate a set of positive synthetic OKR data labels with a gradient scale rating; (d) synthesize a set of negative synthetic OKR data labels by self-supervising the positive synthetic OKR data labels; (e) train a transformer-based, self-supervised bidirectional language model using the set of positive synthetic OKR data labels and the set of negative synthetic OKR data labels; (f) cause execution of the enterprise application on the remote computing system; (g) cause surfacing of a user interface on a display of the remote computing system during the execution of the enterprise application, where the user interface corresponds to a goal-setting feature of the enterprise application; (h) receive, via the surfaced user interface, text input corresponding to an objective for an OKR; (i) assess the text input based on the desired OKR traits using the trained transformer-based, self-supervised bidirectional language model; and (j) cause surfacing of a user interface element on the user interface, where the user interface element includes an indication of whether the text input satisfies each of the desired OKR traits.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 1 is a process flow diagram of another exemplary method for generating Objectives and Key Results (OKRs) within the context of an enterprise application using a machine learning model according to embodiments described herein;

FIG. 2 is a process flow diagram of an exemplary method for training a machine learning model using positive and negative synthetic data generated, at least in part, using a generative pre-trained transformer bidirectional language model according to embodiments described herein;

DETAILED DESCRIPTION

Figure 3:
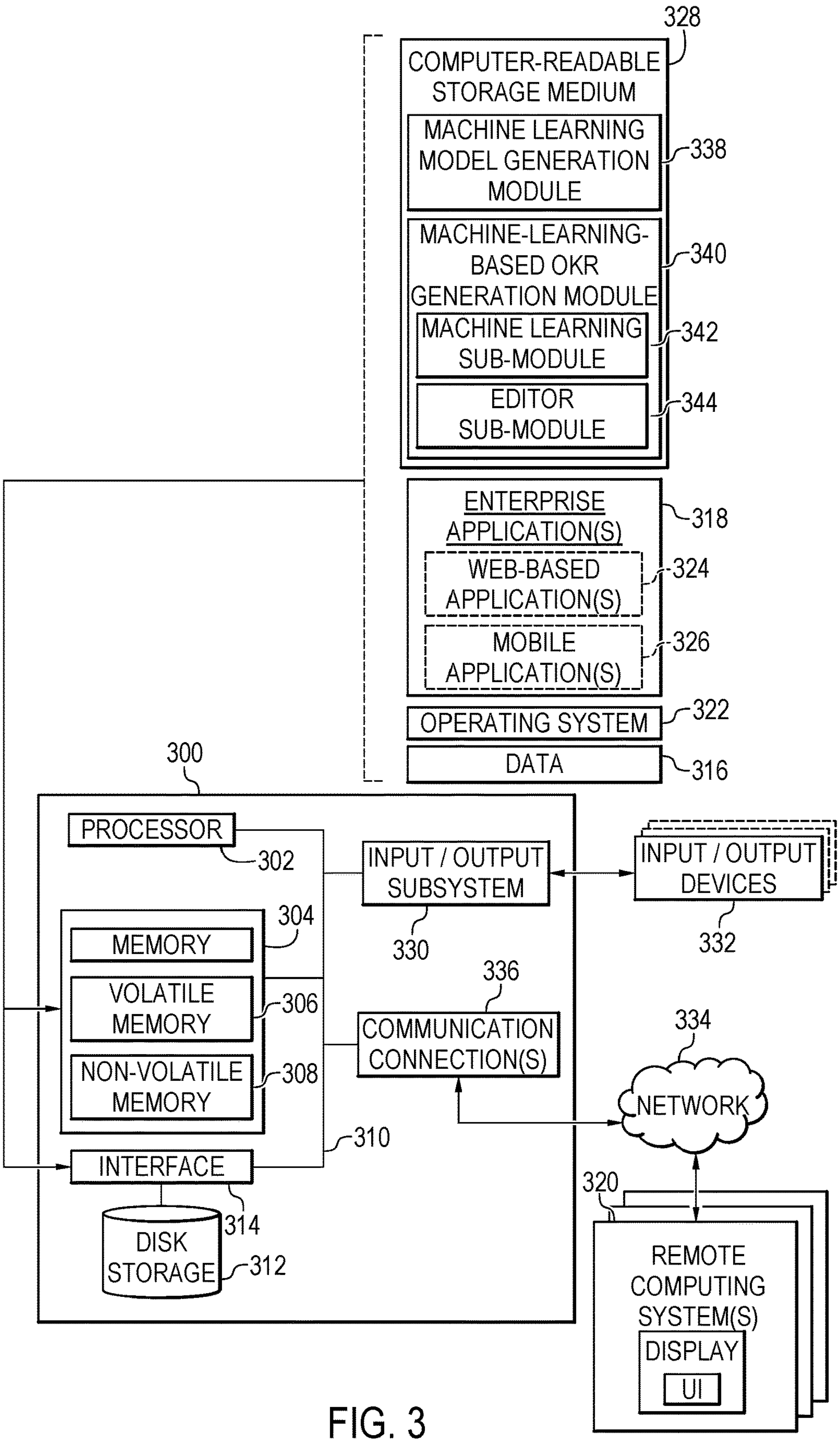
FIG. 3 is a block diagram of an exemplary computing system for implementing the techniques described herein.

Objectives and Key Results (OKRs) are utilized as part of a goal-setting framework to enable enterprises to achieve desired outcomes. In particular, objectives are overarching goals that the enterprise (or some team within the enterprise) desires to accomplish, while key results define the metrics for determining when the corresponding objective has been met. Therefore, while objectives are qualitative, key results are quantitative. In addition, while objectives are often created at the enterprise or organizational level, the corresponding key results may be broken down at the team level or even at the individual user level. Furthermore, in some cases, the metrics represented by the key results may be further broken down into projects, where each project is aimed at satisfying one or more key results. In many cases, the resulting OKRs include a multi-nested structure in which multiple objectives, key results, and/or projects are defined in a hierarchical configuration. As an example, a single parent objective may include one or more key results (e.g., typically one to five key results) nested underneath it. Each key result may, in turn, include one or more projects nested underneath it. Moreover, in some cases, secondary objectives and/or secondary key results can be nested underneath one or more key results. In this manner, each multi-nested OKR is defined as a tree structure, in which progress is rolled up to the parent OKR. In particular, each key result contributes to the parent objective according to a predetermined percentage. When progress is made on a particular key result (or the key result is completed), the completion percentage of the parent objective is automatically updated to reflect the current status of the key results. In this manner, enterprises are provided with a data-driven, quantitative approach for meeting qualitative goals.

Some modern enterprise applications (such as, for example, Microsoft® Viva® provided by Microsoft Corporation) include goal-setting features (such as, for example, Microsoft® Viva® Goals) that enable enterprise users (e.g., OKR owners, OKR champions, administrators, team managers, department heads, employees, and the like) to create and track the enterprise's OKRs. The integration of such goal-setting features directly into enterprise applications is designed to enable enterprise users to unite around the enterprise's strategic priorities, mission, and purpose, thus fostering a highly-productive and engaged work culture that drives successful business outcomes.

However, enterprise users often encounter difficulties with creating high-quality, effective OKRs. In particular, enterprise users struggle to define objectives that effectively describe the enterprise's goals as well as key results that effectively quantify the corresponding objectives. As a result, enterprise users sometimes reach out to OKR coaches for help with enhancing OKR quality. Unfortunately, while OKR coaches are generally successful at increasing OKR quality, this approach suffers from both scalability issues and data privacy concerns as the customer base of the enterprise application continues to expand. Moreover, the interaction with the OKR coach consumes a significant amount of the enterprise user's time, thus reducing the overall productivity of the enterprise.

Therefore, the present techniques address these issues by providing for the machine-learning-based generation of OKRs with respect to enterprise applications. In this context, the term "generation" is used to refer broadly, not only to completely generating OKRs in some cases, but also to assessing and enhancing the quality of already-created (or partially-created) OKRs. Moreover, this may be performed in real-time (or near real-time) as enterprise users attempt to create OKRs for their enterprise. Furthermore, the term "machine-learning-based" refers broadly to the utilization of a machine learning model, such as, for example, a transformer-based, self-supervised bidirectional language model, to perform at least a portion of the OKR generation process described herein.

According to embodiments described herein, the machine-learning-based OKR generation process involves assessing OKR quality as the enterprise user is concurrently inputting the corresponding OKR data via the goal-setting feature of the enterprise application. Such quality assessment is performed, at least in part, using the machine learning model described herein, optionally in combination with one or more editor tools (e.g., spelling and grammar check functions, such as the Editor application programming interface (API) provided by Microsoft corporation). More specifically, the OKR data specified by the enterprise user are provided to the machine learning model as input, and multiple OKR traits of the corresponding objective (or, in some cases, key result) are provided as output to the enterprise user via a corresponding user interface, where the OKR traits are designed to quantify the quality of the OKR. As the enterpriser continues to edit the OKR within the context of the goal-setting feature of the enterprise application, the output OKR traits are updated via the user interface to reflect the current OKR quality, thus enabling the enterprise user to easily discern when the OKR is of sufficient quality. Moreover, in various embodiments, actionable suggestions and/or recommendations for enhancing the OKR quality are also provided to the enterprise user via the user interface to facilitate this process. The ultimate result of this process is the generation of higher-quality OKRs with minimal user time and effort. Furthermore, this process is easily scalable for any enterprise and meets data privacy expectations since it does not require data sharing with third parties.

In various embodiments, the measurable OKR traits that are assessed using the machine learning model are each defined according to rule-based and/or model-based criteria. As an example, a first OKR trait may be the quality of the objective terminology, with the model-based criteria being that a high-quality objective includes terminology that is qualitive, simple, and meaningful, (e.g., as determined using a multi-label text classification model, for example, that is designed to assess the textual data based on these four characteristics), while also being devoid of any grammar or spelling errors (e.g., as determined using the editor module or tool described herein). In this context, the term "simple" is intended to mean that the objective is clear, with a length of less than 20 words. The term "meaningful" is intended to mean that the objective follows the generalized formula of "verb+(what the enterprise wants to do)+in order to/for/so that (what the enterprise hopes to achieve)." The term "qualitative" is intended to mean that the objective does not contain a metric in numeric, alphanumeric, or alphabetical form. A second OKR trait may be the OKR alignment, with the rule-based criteria being that a high-quality objective is aligned to a parent objective. A third OKR trait may be the number of key results nested underneath the objective, with the rule-based criteria being that a high-quality objective should have one to five key results nested underneath it. A fourth OKR trait may be the measurability of the key results, with the model-based criteria being that at least 80% of the key results for a high-quality objective are outcome-based and quantifiable (e.g., including a defined metric for determining completion). Moreover, those skilled in the art will appreciate that some subset of such OKR traits may be utilized or other suitable OKR traits may additionally or alternatively be utilized in some cases, depending on the details of the particular implementation.

Furthermore, embodiments described herein provide a novel training process for generating a machine learning model (e.g., a transformer-based, self-supervised bidirectional language model) that is designed to perform NLP-related tasks (such as the assessment and enhancement of OKR quality). Specifically, such machine learning model is generated (at least in part) using positive synthetic data labels and negative synthetic data labels. In various embodiments, synthetic data (e.g., synthetic OKR data) are first generated using a generative pre-trained transformer bidirectional language model (e.g., in the form of a generative machine learning chatbot or tool). Positive traits (such as rule-based criteria and/or model-based criteria that define a high-quality OKR) are utilized to self-supervise the synthetic data, resulting in the identification of a set of positive synthetic data labels. Negative synthetic data labels are then synthesized based on negative traits (e.g., generally the opposite of the positive criteria and/or the absence of the positive criteria). In some embodiments, this involves self-supervising the positive synthetic data labels by, for example, generating permutations of the positive synthetic data labels and/or performing data augmentation techniques to modify (e.g., add and/or remove terms from) the positive synthetic data labels with the positive traits to produce negative synthetic data labels with negative traits. The positive synthetic data labels and the negative synthetic data labels (generally along with other data labels obtained from public website data, enterprise-level data obtained from one or more property graphs maintained by the application service provider, and/or other suitable type(s) of traditional data) are then used to train the machine learning model (e.g., the transformer-based, self-supervised bidirectional language model) that is utilized according to embodiments described herein.

As used herein, the term "enterprise application" may refer to any suitable types of web-based applications, mobile applications, and/or other applications/services that are provided by an application service provider. Moreover, the term "enterprise application" is used herein with reference to an application that forms part of a suite or package of products/services (or some subset of such suite/package) that is provided by the application service provider to enable users who are associated with an enterprise to interact with their corresponding computing systems to perform tasks relating to the enterprise, including OKR-related tasks. As a non-limiting example, if the application service provider is Microsoft Corporation, the enterprise applications described herein may include (but are not limited to) Microsoft® Viva®, Microsoft® Teams®, Microsoft® Outlook®, and/or Microsoft® Engage® (among others). More generalized examples of suitable enterprise applications include (but are not limited to) email/communication applications, social networking applications, employee experience applications, and the like. In other words, the techniques described herein may be implemented within the context of a broad range of web-based applications, mobile applications, and/or additional applications/services that are utilized for enterprise-related tasks, including OKR-related tasks. More broadly speaking, the term "enterprise application" may refer to any type of application or service that supports the OKR features described herein.

The term "goal-setting feature" is used herein to refer to a tool or feature of an enterprise application that enables the OKR-related tasks described herein. Thus, while Microsoft® Viva® Goals is provided as an exemplary embodiment of such a goal-setting feature, those skilled in the art will appreciate that any other suitable type of tool or feature could be utilized as long as it supports the OKR-related tasks described herein.

Turning now to a detailed description of the drawings, FIG. 1 is a process flow diagram of an exemplary method 100 for generating Objectives and Key Results (OKRs) within the context of an enterprise application using a machine learning model according to embodiments described herein. The method 100 is executed via one or more computing systems, such as the exemplary computing system described with respect to FIG. 3. In particular, in various embodiments, the computing system(s) implementing the method 100 includes computing system(s) or server(s) that are run by an application service provider that provides for the execution of one or more enterprise applications on remote computing systems. The computing system(s) include one or more processors and one or more computer-readable storage media including computer-executable instructions that, when executed by the processor(s), cause the processor(s) to perform the blocks of the method 100. An exemplary embodiment of such computer-readable storage media is described with respect to FIG. 5. Moreover, in various embodiments, the method 100 is executed within the context of a network environment including one or more application service provider computing system(s)/server(s), as described further with respect to the exemplary network environment of FIG. 4.

The method 100 begins block 102, at which an enterprise application is executed on a remote computing system via a network. At block 104, a user interface is surfaced (or caused to be surfaced) on the display of the remote computing system during the execution of the enterprise application, where the user interface corresponds to a goal-setting feature of the enterprise application. As an example, if the enterprise application is Microsoft® Viva®, the goal-setting feature may be Viva® Goals.

At block 106, text input corresponding to an objective for an OKR is received via the surfaced user interface. At block 108, the text input is assessed based on multiple desired OKR traits using a machine learning model. In various embodiments, the desired OKR traits are defined based on rule-based criteria and/or model-based criteria, as described herein. In various embodiments, block 108 also includes performing a spell check operation and/or a grammar check operation on the text input and then incorporating the output from the spell check operation and/or the grammar check operation into the assessment of the text input based on the desired OKR traits, as described herein.

In various embodiments, the method 100 also includes, prior to executing block 108, generating the machine learning model by: (a) generating synthetic OKR data using a generative pre-trained transformer bidirectional language model; (b) self-supervising the generated synthetic OKR data based on the desired OKR traits; (c) generating, based on the self-supervised synthetic OKR data, a set of positive synthetic OKR data labels with gradient scale rating; (d) synthesizing a set of negative synthetic OKR data labels by self-supervising the positive synthetic OKR data labels; and (e) training the machine learning model using the set of positive synthetic OKR data labels and the set of negative synthetic OKR data labels. This process is described further with respect to the method 200 of FIG. 2. Furthermore, in some embodiments, the machine learning model is a transformer-based, self-supervised bidirectional language model.

At block 110, a user interface element is surfaced (or caused to be surfaced) on the user interface, where the user interface element includes an indication of whether the text input satisfies each of the desired OKR traits. In various embodiments, block 110 also includes surfacing one or more actionable suggestions and/or one or more actionable recommendations for modifying the text input such that the text input will satisfy one or more desired OKR traits that have not yet been satisfied, as described herein.

At optional block 112, a modification to the text input is received via the surfaced user interface element. At optional block 114, the surfaced user interface element is adapted to update the indication of whether the text input satisfies each of the desired OKR traits. Moreover, at optional block 116, the OKR is finalized and loaded into the goal-setting feature of the enterprise application responsive to the text input satisfying a specified number or percentage of the desired OKR traits, which may be determined responsive to user input received via the user interface.

The block diagram of FIG. 1 is not intended to indicate that the blocks of the method 100 are to be executed in any particular order, or that all of the blocks of the method 100 are to be included in every case. Moreover, any number of additional blocks may be included within the method 100, depending on the details of the specific implementation. For example, in some embodiments, the method 200 also includes collecting user feedback regarding the results of the method 200. Such user feedback may be in the form of online surveys, user ratings, customer interviews, and the like. In such embodiments, the method 200 further includes utilizing the collected user feedback to optimize the method 200, e.g., by iteratively updating the machine learning model. Moreover, in some embodiments, the method may be performed for text input corresponding to a key result (rather than an objective) for an OKR, in which case the desired OKR traits may be designed to produce high-quality key results rather than high-quality objectives.

FIG. 2 is a process flow diagram of another exemplary method for training a machine learning model using positive and negative synthetic data generated, at least in part, using a generative pre-trained transformer bidirectional language model according to embodiments described herein. The method 200 is executed via one or more computing systems, such as the exemplary computing system described with respect to FIG. 3. In particular, in various embodiments, the computing system(s) implementing the method 200 includes computing system(s) or server(s) that are run by an application service provider that provides for the execution of one or more enterprise applications on remote computing systems. The computing system(s) include one or more processors and one or more computer-readable storage media including computer-executable instructions that, when executed by the processor(s), cause the processor(s) to perform the blocks of the method 200. An exemplary embodiment of such computer-readable storage media is described with respect to FIG. 5. Moreover, in various embodiments, the method 200 is executed within the context of a network environment including one or more application service provider computing system(s)/server(s), as described further with respect to the exemplary network environment of FIG. 4.

The method 200 begins block 202, at which synthetic data are generated using a generative pre-trained transformer bidirectional language model. At block 204, the generated synthetic data are self-supervised based on positive traits including rule-based criteria and/or model-based criteria, as described herein. At block 206, a set of positive synthetic data labels with gradient scale rating is generated from the synthetic data.

At block 208, a set of negative synthetic data labels is generated by self-supervising the positive synthetic data labels. In various embodiments, this includes generating permutations of the positive synthetic data labels and/or performing data augmentation to modify the positive synthetic data labels.

At block 210, a machine learning model (e.g., a transformer-based, self-supervised bidirectional language model) is trained using the set of positive synthetic data labels and the set of negative synthetic data labels. In some embodiments, the machine learning model is trained using traditional data labels, in addition to the set of positive synthetic data labels and the set of negative synthetic data labels. In such embodiments, the method 200 may further include scraping at least a portion of the traditional data labels from public websites and/or generating at least a portion of the traditional data labels from enterprise-level data obtained from a property graph.

In some embodiments of the method 200, the synthetic data include synthetic OKR data, and the positive traits correspond to desired OKR traits. In such embodiments, the machine learning model is trained to assess the quality of OKR input data based on adherence to the desired OKR traits, as described herein.

The block diagram of FIG. 2 is not intended to indicate that the blocks of the method 200 are to be executed in any particular order, or that all of the blocks of the method 200 are to be included in every case. Moreover, any number of additional blocks may be included within the method 200, depending on the details of the specific implementation.

The present techniques provide various advantages over conventional OKR solutions. As an example, the present techniques provide automated OKR assessment and enhancement within the context of the goal-setting feature of an enterprise application, thus requiring minimal user input (e.g., typically only a few clicks). This saves the user time and reduces the user's dependence on other out-of-application tools, thus increasing the overall productivity of the corresponding enterprise. As another example, the present techniques are easily scalable to any size of enterprise and any number of enterprises and will not suffer from reduced quality as the customer base continues to increase. As another example, the present techniques utilize machine learning techniques to assess and enhance OKR quality and, thus, do not suffer from the same limitations as conventional approaches, which are limited in terms of the parameters used to evaluate the OKRs and therefore frequently produce erroneous or sub-optimal results. As another example, because the present techniques rely on machine learning techniques, enterprise users can receive real-time (or near real-time) feedback on OKR quality as they are concurrently inputting the desired OKR parameters or terminology via the user interface, thus increasing the speed with which users can create high-quality OKRs. As another example, the present techniques provide for the training of a machine learning model using both positive and negative synthetic data samples obtained, at least in part, via a generative pre-trained transformer bidirectional language model, thus increasing the ease with which new machine learning models can be created even when minimal relevant data samples are initially available.

Moreover, the present techniques advantageously provide OKR quality assessment within the context of the enterprise application itself, providing actionable suggestions and/or recommendations for enhancing the OKR quality in real-time (or near real-time) as the enterprise user creates the OKR. As a result, enterprise users may strive to improve the quality of their OKRs, resulting in the generation of higher-quality OKRs for the enterprise. The enterprise's objectives may correspondingly become increasingly focused toward achieving the enterprise's desired goals. Furthermore, the accuracy of the key results may correspondingly increase as a result of the definitive metrics that are used to measure OKR progress. The enterprise application may also advantageously provide enterprise users with an in-app analytics view showing the aggregate quality of the corresponding OKRs, enabling such users to easily discern areas for improvement within the enterprise's OKR structure.

FIG. 3 is a block diagram of an exemplary computing system 300 for implementing the techniques described herein. The exemplary computing system 300 includes a processor 302 and a memory 304. The processor 302 may include any suitable type of processing unit or device, such as, for example, a single-core processor, a multi-core processor, a computing cluster, or any number of other configurations. Moreover, the processor 302 may include, for example, an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 304 typically (but not always) includes both volatile memory 306 and non-volatile memory 308. The volatile memory 306 retains or stores information so long as the memory is supplied with power. By contrast, the non-volatile memory 308 is capable of storing (or persisting) information even when a power supply is not available. The volatile memory 306 may include, for example, RAM (e.g., synchronous RAM (SRAM), dynamic RAM (DRAM), synchronous dynamic RAM (SDRAM), and the like) and CPU cache memory. The nonvolatile memory 308 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 302 and the memory 304, as well as other components of the computing system 300, are interconnected by way of a system bus 310. The system bus 310 can be implemented using any suitable bus architecture known to those skilled in the art.

According to the embodiment shown in FIG. 3, the computing system 300 also includes a disk storage 312. The disk storage 312 may include any suitable removable/non-removable, volatile/non-volatile storage component or device. For example, the disk storage 312 may include, but is not limited to, a magnetic disk drive, floppy disk drive, tape drive, Jaz drive, Zip drive, LS-210 drive, flash memory card, memory stick, or the like. In addition, the disk storage 312 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 312 to the system bus 310, a removable or non-removable interface is typically used, such as interface 314 shown in FIG. 3.

In various embodiments, the disk storage 312 and/or the memory 304 function as one or more databases that are used to store data 316 relating to the techniques described herein. Such data 316 may include, but are not limited to, datasets (e.g., including the positive and negative synthetic data described herein, as well as publicly-available OKR datasets) that are used to train a machine learning model for assessing and enhancing OKR quality as well as OKR data obtained during the execution of one or more enterprise application(s) 318 on various remote computing systems 320 according to embodiments described herein.

Those skilled in the art will appreciate that FIG. 3 describes software that acts as an intermediary between a user of the computing system 300 and the basic computing resources described with respect to the operating environment of the computing system 300. Such software includes an operating system 322. The operating system 322, which may be stored on the disk storage 312, acts to control and allocate the computing resources of the computing system 300. Moreover, the enterprise application(s) 318, including one or more web-based applications 324 and/or one or more mobile applications 326, take advantage of the management of the computing resources by the operating system 322 through one or more program modules stored within a computer-readable storage medium (or media) 328, as described further herein.

The computing system 300 also includes an input/output (I/O) subsystem 330. The I/O subsystem 330 includes a set of hardware, software, and/or firmware components that enable or facilitate inter-communication between the user of the computing system 300 and the processor 302 of the computing system 300. During operation of the computing system 300, the I/O subsystem 330 enables the user to interact with the computing system 300 through one or more I/O devices 332. Such I/O devices 332 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 302 through the system bus 310 via one or more interface ports (not shown) integrated within the I/O subsystem 330. Such interface ports may include, for example, a serial port, a parallel port, a game port, and/or a universal serial bus (USB).

In addition, such I/O devices 332 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 300 and to output information from the computing system 300 to a corresponding output device. Moreover, in some embodiments, the one or more output devices or channels are accessible via one or more adapters (not shown) integrated within the I/O subsystem 330.

In various embodiments, the computing system 300 is communicably coupled to any number of remote computing systems 320. The remote computing system(s) 320 may include, for example, one or more personal computers (e.g., desktop computers, laptop computers, or the like), one or more tablets, one or more mobile devices (e.g., mobile phones), one or more network PCs, and/or one or more workstations. As an example, in some embodiments, the computing system 300 is an application service provider server hosting the enterprise application(s) 318 in a networked environment using logical connections to the remote computing systems 320. In such embodiments, the computing system 300 provides for the execution of the enterprise application(s) 318 on the remote computing systems 320 with the enhanced functionality provided by the techniques described herein.

In various embodiments, the remote computing systems 320 are logically connected to the computing system 300 through a network 334 and then connected via a communication connection 336, which may be wireless. The network 334 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 336 includes the hardware/software employed to connect the network 334 to the bus 310. While the communication connection 336 is shown for illustrative clarity as residing inside the computing system 300, it can also be external to the computing system 300. The hardware/software for connection to the network 334 may include, for example, internal and external technologies, such as mobile phone switches, modems including regular telephone grade modems, cable modems and DSL modems, ISDN adapters, and/or Ethernet cards.

As described above, the system applications, such as the enterprise application(s) 318, take advantage of the management of the computing resources by the operating system 322 through one or more program modules stored within the computer-readable storage medium (or media) 328. In some embodiments, the computer-readable storage medium 328 is integral to the computing system 300, in which case it may form part of the memory 304 and/or the disk storage 312. In other embodiments, the computer-readable storage medium 328 is an external device that is connected to the computing system 300 when in use.

In various embodiments, the one or more program modules stored within the computer-readable storage medium 328 include program instructions or code that may be executed by the processor 302 to perform various operations. In various embodiments, such program module(s) include, but are not limited to, a machine learning model generation module 338 that causes the processor 302 to perform operations resulting in the training of a machine learning model using positive and negative synthetic data generated, at least in part, using a generative pre-trained transformer bidirectional language model, as described with respect to the method 100 of FIG. 1, for example. Such program module(s) may also include, but are not limited to, a machine-learning-based OKR generation module 340 that causes the processor 302 to perform operations that result in the generation of OKRs within the context of an enterprise application using the machine learning model described herein, as described with respect to the method 200 of FIG. 2, for example. Moreover, in some embodiments, the machine-learning-based OKR generation module 340 may be broken down into one or more sub-modules, such as, for example, a machine learning sub-module 342 that causes the processor 302 to utilize the generated machine learning model to assess and enhance the quality of OKR data according to multiple OKR traits and an editor sub-module 344 that causes the processor 302 to perform spelling and grammar check operations with respect to the OKR data.

It is to be understood that the block diagram of FIG. 3 is not intended to indicate that the computing system 300 is to include all of the components shown in FIG. 3. Rather, the computing system 300 can include fewer or additional components not illustrated in FIG. 3 (e.g., additional applications, additional modules, additional memory devices, additional network interfaces, etc.). Furthermore, any of the functionalities of the one or more program modules/sub-modules may be partially, or entirely, implemented in hardware and/or in the processor 302. For example, the functionality may be implemented with an application specific integrated circuit, in logic implemented in the processor 302, or in any other device.

Figure 4:
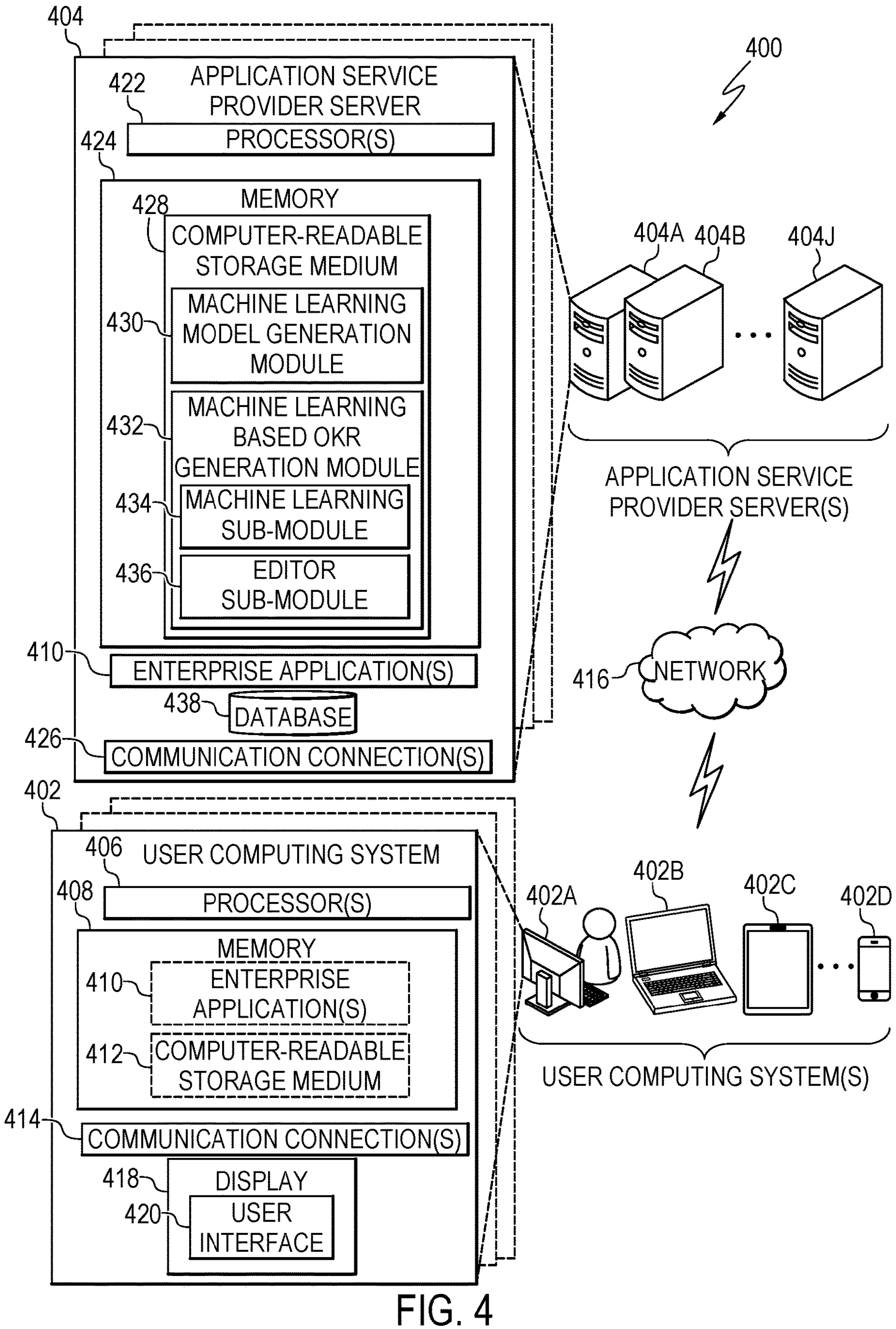
FIG. 4 is a block diagram of an exemplary network environment for implementing the techniques described herein.

FIG. 4 is a block diagram of an exemplary network environment 400 for implementing the techniques described herein. As shown in FIG. 4, the network environment 400 includes one or more user computing systems 402 and one or more application service provider servers 404. Each user computing system 402 includes one or more processors 406 and memory 408 communicably coupled to the processor(s) 406. Each user computing system 402 may be implemented as any type of computing system, including (but not limited to) a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, and so forth. FIG. 4 shows representative user computing systems in the forms of a desktop computer 402A, a laptop computer 402B, a tablet 402C, and a mobile device 402D. However, these are merely examples, and the user computing system(s) 402 described herein may take many other forms.

Each user computing system 402 may include one or more enterprise applications 410 (and/or data corresponding to the execution of such enterprise application(s) 410) and one or more computer-readable storage media 412 stored in the memory 408, as described with respect to the computing system 300 of FIG. 3, for example. Each user computing system 402 also includes a communication connection 414 by which the user computing system 402 is able to communicate with other devices, including the application service provider server(s) 404, over a network 416. Furthermore, each user computing system 402 includes a display 418, which may be a built-in display or an external display, depending on the particular type of computing system. According to embodiments described herein, the display 418 is configured to surface one or more user interfaces (UIs) 420, including one or more UIs that provide functionalities for performing machine-learning-based OKR generation during the execution of a goal-setting feature of an enterprise application 410, as described herein.

In various embodiments, the enterprise application(s) 410 are implemented or hosted by the application service provider server(s) 404, which may be provided as one or more server farms or data centers, for example. As an example, in the embodiment shown in FIG. 4, the application service provider server 404 includes multiple servers 404A-J, for example. Moreover, it should be noted that the server components shown in FIG. 4 may each be implemented within any or all of the multiple application service provider servers 404, depending on the details of the particular implementation. Specifically, the application service provider server(s) 404 include one or more processors 422 communicably coupled to memory 424. The memory 424 may include one or more multiple memory devices, depending on the details of the particular implementation. The application service provider server(s) 404 also include one or more communication connections 426 by which the enterprise application(s) 410 described herein may be executed or hosted on the user computing system(s) 402 via the network 416. In particular, the application service provider server(s) 404 provide for execution of the enterprise application(s) 410 on the user computing system(s) 402 by, for example, surfacing one or more UIs 420 associated with the enterprise application(s) 410 on the display 418 corresponding to each user computing system 402.

In various embodiments, the memory 424 includes the enterprise application(s) 410 described herein, as well as one or more computer-readable storage media 428. The computer-readable storage medium (or media) 428 includes program instructions or code that may be executed by the processor(s) 422 (and/or the processor(s) 406) to perform various operations. In various embodiments, such program module(s) include, but are not limited to, a machine learning model generation module 430 that causes the processor(s) 422 to perform operations resulting in the training of a machine learning model using positive and negative synthetic data generated, at least in part, using a generative pre-trained transformer bidirectional language model, as described with respect to the method 100 of FIG. 1, for example. Such program module(s) may also include, but are not limited to, a machine-learning-based OKR generation module 432 that causes the processor(s) 422 to perform operations that result in the generation of OKRs within the context of an enterprise application using the machine learning model described herein, as described with respect to the method 200 of FIG. 2, for example. Moreover, in some embodiments, the machine-learning-based OKR generation module 432 may be broken down into one or more sub-modules, such as, for example, a machine learning sub-module 434 that causes the processor(s) 422 to utilize the generated machine learning model to assess and enhance the quality of OKR data according to multiple OKR traits and an editor sub-module 436 that causes the processor(s) 422 to perform spelling and grammar check operations with respect to the OKR data. The memory 424 further includes a database 438, which may be configured to store (among other data) datasets (e.g., including the positive and negative synthetic data described herein) that are used to train a machine learning model for assessing and enhancing OKR quality, as well as OKR data obtained during the execution of the enterprise application(s) 410 on the remote computing system(s) 402 according to embodiments described herein.

In some embodiments, at least a portion of the modules 430 and/or 432 (and/or the sub-modules 434 and/or 436) may be stored within separate application service provider server(s) 404. For example, one or more application service provider server(s) 404 may be dedicated to the machine learning model generation module 430, while one or more separate application service provider server(s) 404 may be dedicated to the machine-learning-based OKR generation module 432. Moreover, in some embodiments, the machine-learning-based OKR generation module 432 may be further broken down into separate application service provider server(s) 404, with one or more application service provider server(s) 404 being dedicated to executing the spelling and grammar check functions provided by the editor sub-module 436 and one or more other application service provider server(s) 404 being dedicated to executing the OKR assessment and enhancement functions provided by the machine learning sub-module 434. However, those skilled in the art will appreciate that the techniques described herein are not limited to any particular configuration of the application service provider server(s) 404.

It is to be understood that the simplified block diagram of FIG. 4 is not intended to indicate that the network environment 400 is to include all of the components shown in FIG. 4. Rather, the network environment 400 may include different components and/or additional components not illustrated in FIG. 4. For example, in practice, the user computing system(s) 402 and the application service provider server(s) 404 will typically include a number of additional components not depicted in the simplified block diagram of FIG. 4, as described with respect to the computing system 300 of FIG. 3, for example.

Figure 5:
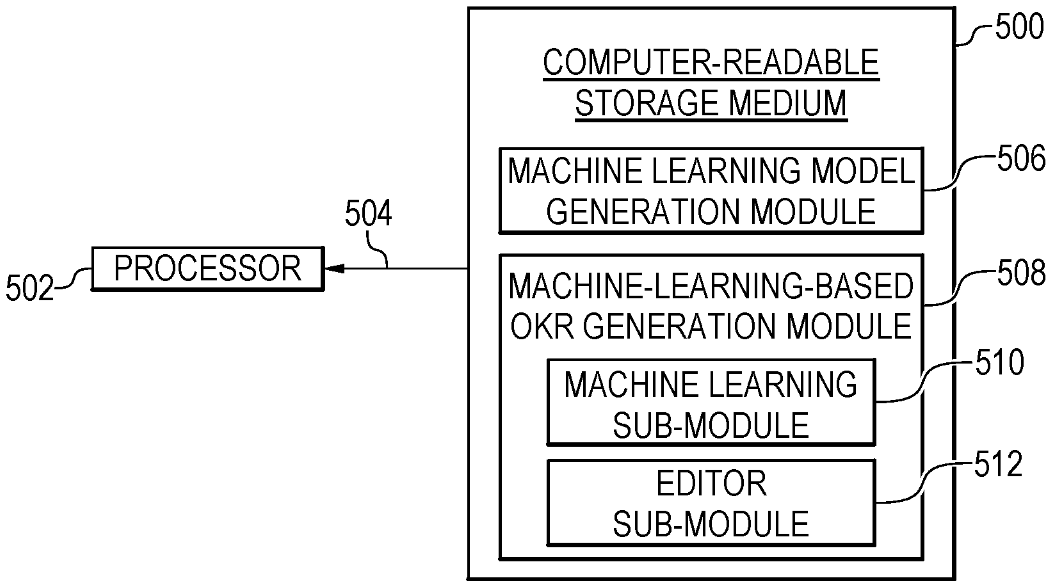
FIG. 5 is a block diagram of an exemplary computer-readable storage medium for implementing the techniques described herein.

FIG. 5 is a block diagram of an exemplary computer-readable storage medium (or media) 500 for implementing the techniques described herein. In various embodiments, the computer-readable storage medium 500 is accessed by one or more processor(s) 502 over one or more computer interconnects 504. For example, in some embodiments, the computer-readable storage medium 500 is the same as, or similar to, the computer-readable storage medium described with respect to the computing system 300 of FIG. 3 and/or the network environment 400 of FIG. 4.

In various embodiments, the computer-readable storage medium 500 includes code (i.e., computer-executable instructions) to direct the processor(s) 502 to perform the operations of the present techniques. Such code may be stored within the computer-readable storage medium 500 in the form of program modules, where each module includes a set of computer-executable instructions that, when executed by the processor(s) 502, cause the processor(s) 502 to perform a corresponding set of operations. In particular, as described herein, the computer-readable storage medium 500 includes a machine learning model generation module 506 and a machine-learning-based OKR generation module 508 (as well as the corresponding machine learning sub-module 510 and editor sub-module 512) that direct the processor(s) 502 to perform the techniques described herein.

Moreover, those skilled in the art will appreciate that any suitable number of the modules shown in FIG. 5 may be included within the computer-readable storage medium (or media) 500. Furthermore, any number of additional modules/sub-modules not shown in FIG. 5 may be included within the computer-readable storage medium (or media) 500, depending on the details of the specific implementation.

Figure 6:
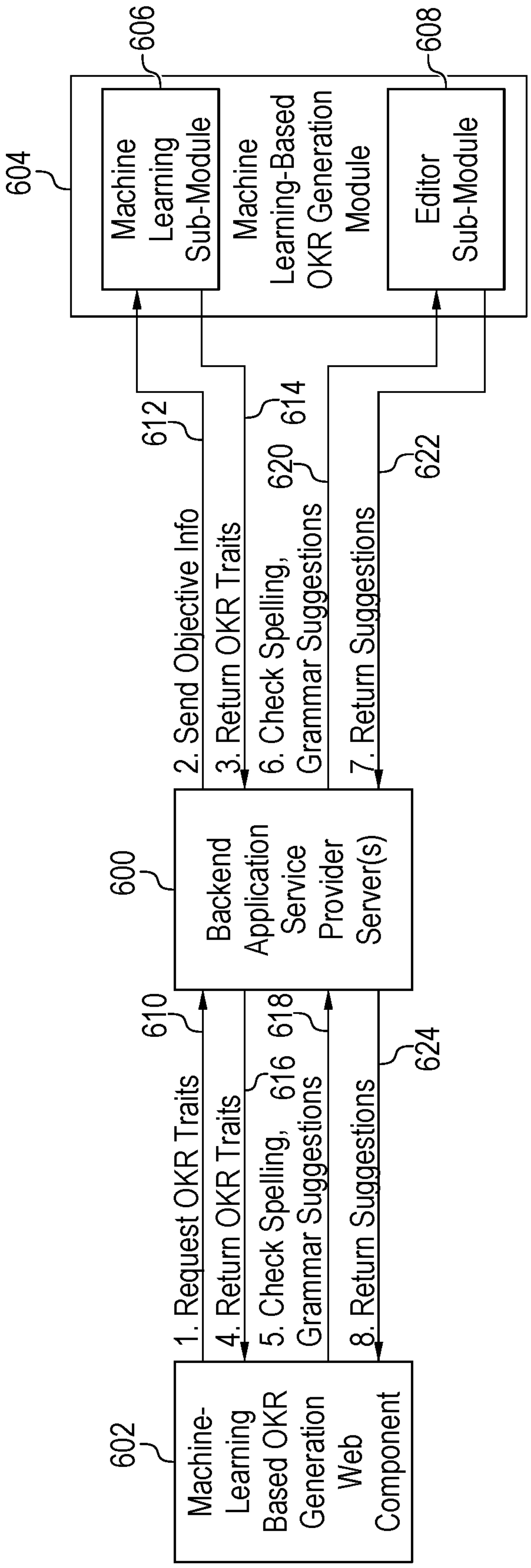
FIG. 6 is a process flow diagram of an exemplary implementation of a portion of the machine-learning-based OKR generation techniques described herein.

FIG. 6 is a process flow diagram of an exemplary implementation of a portion of the machine-learning-based OKR generation techniques described herein. Specifically, FIG. 6 depicts one or more backend application service provider servers 600 that are dedicated to causing the execution of the goal-setting feature of the enterprise application, a machine-learning-based OKR generation web component 602 that provides for the execution of the present techniques with respect to a remote computing system, and a machine-learning-based OKR generation module 604 corresponding to the goal-setting feature of the enterprise application 600, which further includes a machine learning sub-module 606 and an editor sub-module 608, as described herein. FIG. 6 further depicts a number of arrows directed between the aforementioned components, where each arrow (or at least a portion of such arrows) represents an application programming interface (API) call between the corresponding components.

In particular, as indicated by a first arrow 610, the machine-learning-based OKR generation web component 602 may receive OKR input data for the enterprise user and may then send the backend application service provider server(s) 600 a request for the OKR traits corresponding to such OKR input data. As indicated by arrow 612, the backend application service provider server(s) 600 may respond by forwarding the objective information represented by the OKR input data to the machine learning sub-module 606 of the machine-learning-based OKR generation module 604. In response, the machine-learning sub-module 606 may return the detected OKR traits to the backend application service provider server(s) 600, as indicated by arrow 614, and the backend application service provider server(s) 600 may then return the OKR traits to the machine-learning-based OKR generation web component 602, as indicated by arrow 616. Moreover, simultaneously (or substantially simultaneously) with the actions indicated by arrows 610 to 616, the machine-learning-based OKR generation web component 602 may send a spelling and grammar check request to the backend application service provider server(s) 600, as indicated by arrow 618, which may then forward the request to the editor sub-module 608 of the machine-learning-based OKR generation module 604, as indicated by arrow 620. In response, the editor sub-module 608 may return spelling and grammar check results and/or suggestions to the backend application service provider server(s) 600, as indicated by arrow 622, and the backend application service provider server(s) 600 may then return the spelling and grammar results/suggestions to the machine-learning-based OKR generation web component 602, as indicated by arrow 624, where such results/suggestions may then be integrated into and/or combined with one or more of the returned OKR traits. In this manner, the machine-learning-based OKR generation web component 602 utilizes a number of API calls, for example, to obtain the relevant information for assessing and enhancing the quality of the OKR, all within the context of the enterprise application. This information is then provided to the enterprise user via the corresponding user interface (not shown), thus enabling the enterprise user to quickly and efficiently create a high-quality, customized OKR.

Figure 7:
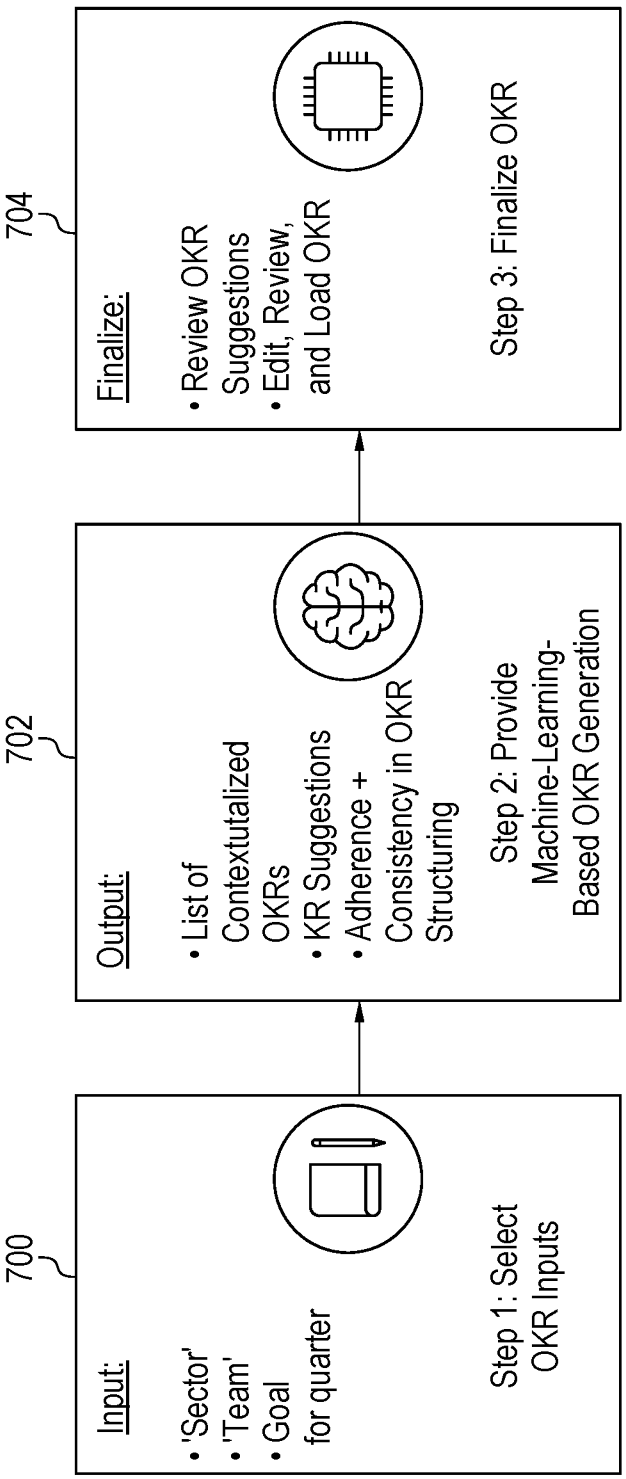
FIG. 7 is a process flow diagram of an exemplary implementation of the machine-learning-based OKR generation techniques described herein from the perspective of an enterprise user.

FIG. 7 is a process flow diagram of an exemplary implementation of the machine-learning-based OKR generation techniques described herein from the perspective of an enterprise user. In particular, from the enterprise user's perspective, the OKR generation process described herein may include three general steps that result in the creation of a high-quality, customized OKR within minutes. Turning to the first step 700 of the exemplary implementation of FIG. 7, the user begins by specifying the desired OKR inputs. This may include inputting data relating to the relevant sector and team for the OKR, for example, as well as inputting the objective of the OKR by providing terminology relating to one of the enterprise's goal for the quarter, for example.

Turning now to the second step 702 of the exemplary implementation of FIG. 7, responsive to the OKR inputs provided at the first step 700, machine-learning-based OKR generation outputs are provided. Such outputs may include, but are not limited to, output data corresponding to a list of contextualized OKRs, key result suggestions, and/or information regarding the adherence and consistency in the OKR structuring. In various embodiments, such output data take the form of a list of desired OKR traits for the objective, along with an indication of whether the objective satisfies the rule-based criteria and/or the model-based criteria for each OKR trait. Such output data may further include customized recommendations and/or suggestions for satisfying the rule-based criteria and/or the model-based criteria for the OKR traits that have not yet been satisfied.

Turning finally to the third step 704 of the exemplary implementation of FIG. 7, the OKR is finalized by, for example, reviewing the OKR suggestions and then editing, reviewing, and loading the final OKR. In various embodiments, this may represent an iterative process in which the input data from the first step 700 are edited until the output data from the second step 702 indicate that the objective has met all (or some suitable portion) of the OKR traits, at which point the enterprise user may deem the OKR to be complete and ready to load into the goal-setting feature of the enterprise application.

Those skilled in the art will appreciate that the exemplary implementations depicted and described with respect to FIGS. 6 and 7 are for illustrative purposes only and are not intended to indicate that the techniques described herein are limited to those particular implementations. Rather, the OKR generation techniques described herein can be implemented in any other suitable manner without departing from the scope of the disclosed subject matter.

The following is a description of several exemplary implementations of the techniques described herein for particular use-case scenarios. Those skilled in the art will appreciate that such exemplary implementations are for illustrative purposes only. In practice, the techniques described herein may be implemented in any other suitable manner to achieve any other suitable results, depending on the details of the particular implementation.

Figure 8A:
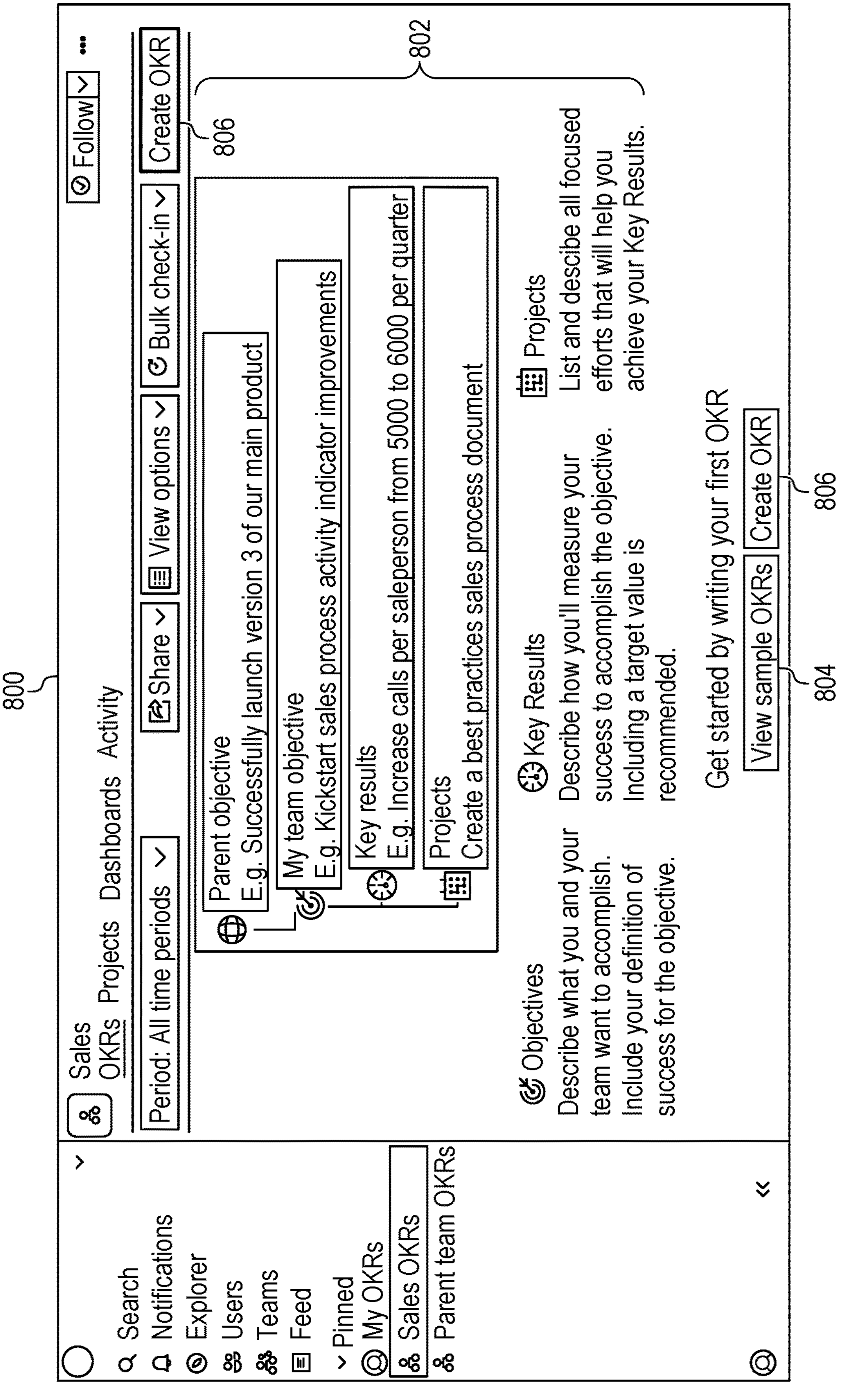
FIG. 8A is a schematic view of a user interface surfaced on a display of a remote computing system during the execution of an enterprise application according to embodiments described herein, where the user interface corresponds to a goal-setting feature of the enterprise application.

Turning to the details of the first exemplary implementation, FIG. 8A is a schematic view of a user interface 800 surfaced on a display of a remote computing system during the execution of an enterprise application according to embodiments described herein, where the user interface 800 corresponds to a goal-setting feature of the enterprise application. As shown in FIG. 8A, the user interface includes OKR information 802, including an example of the hierarchical structure of successful OKRs in which one or more team objectives are nested underneath a parent objective, with one or more key results (and, optionally, one or more corresponding projects) nested underneath each team objective. The OKR information 802 also includes a description of the terms "Objective," "Key Results," and "Projects," where such information is geared towards helping the enterprise user to begin creating high-quality OKRs. To that end, the exemplary user interface also includes user interface elements 804 and 806 (e.g., button elements) for viewing sample OKRs and creating an OKR, respectively.

Figure 8B:
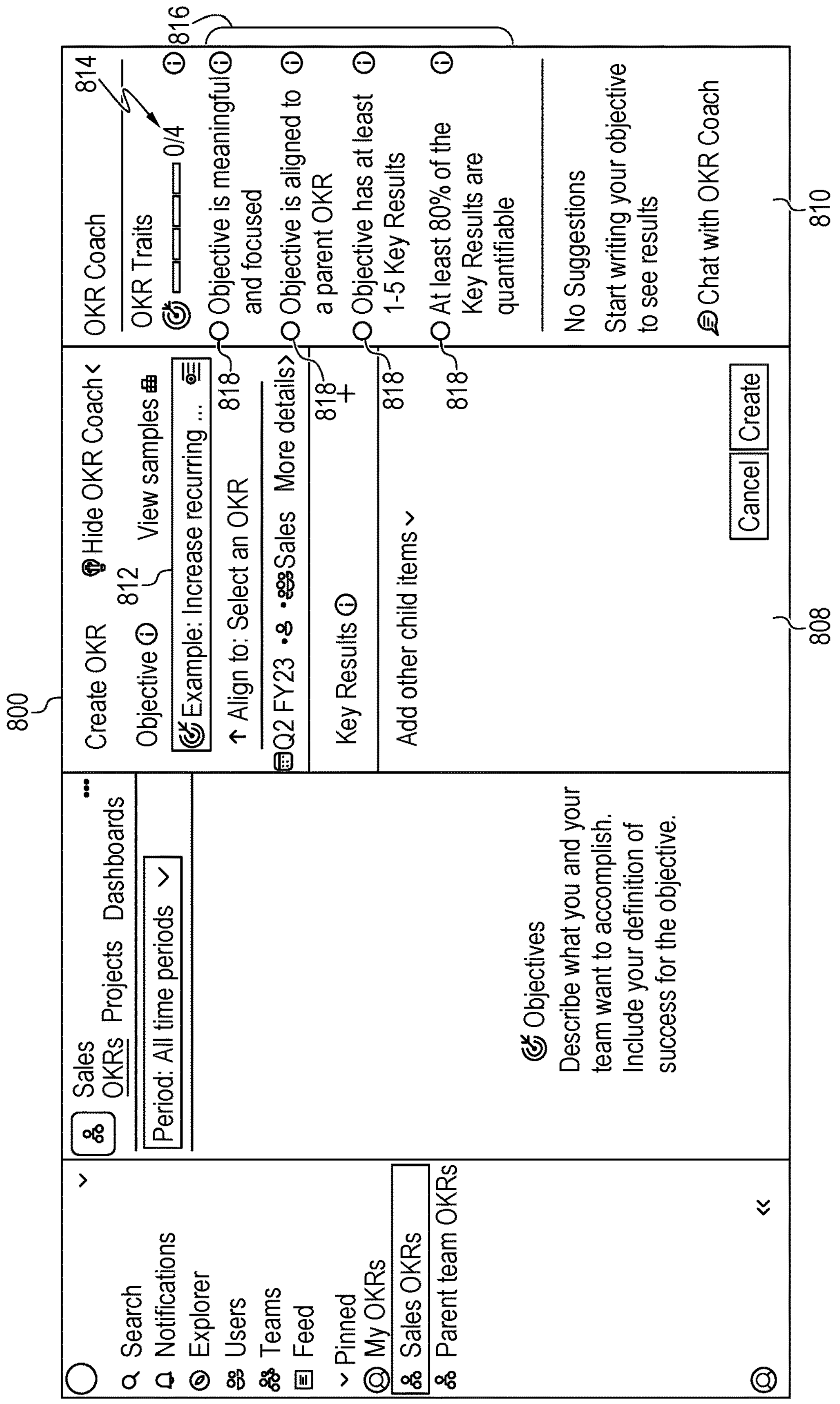
FIG. 8B is a schematic view of the user interface of FIG. 8A, in which an OKR creation user interface element and an OKR coach user interface element have been surfaced on the user interface.

FIG. 8B is a schematic view of the user interface 800 of FIG. 8A, in which an OKR creation user interface element 808 and a OKR coach user interface element 810 (the latter of which corresponds to the machine-learning-based OKR generation techniques described herein) have been surfaced on the user interface 800 (e.g., responsive to the enterprise user selecting the user interface element 806 for creating an OKR). According to the depicted embodiment, the OKR creation user interface element 808 and the OKR coach user interface element 810 are provided as adjacent collapsible pane elements. However, in other embodiments, the OKR creation user interface element 808 and/or the OKR coach user interface element 810 may be provided as popover element(s) or any other suitable type(s) of user interface element(s).

As shown in FIG. 8B, the OKR creation user interface element 808 includes a text field 812 that enables the enterprise user to input terminology corresponding to the desired objective. Moreover, the OKR coach user interface element 810 includes an OKR quality score 814, as well as a list view 816 of each OKR trait that is represented by the OKR quality score 814. According to the embodiment shown in FIG. 8B, four equally-weighted OKR traits are considered, where such OKR traits include: (1) "Objective is meaningful"; (2) "Objective is aligned to a parent OKR"; (3) "Objective has at least 1-5 Key Results"; and (4) "At least 80% of the Key Results are quantifiable." As described above, OKR traits (1) and (4) include model-based criteria, while OKR traits (2) and (3) include rule-based criteria. Furthermore, according to the embodiment shown in FIG. 8B, each OKR trait includes an indicator 818 showing whether the OKR trait has been satisfied. According to this embodiment, because the enterprise user has not yet entered any text into the text field 812, zero out of the four OKR traits have been satisfied.

Figure 8C:
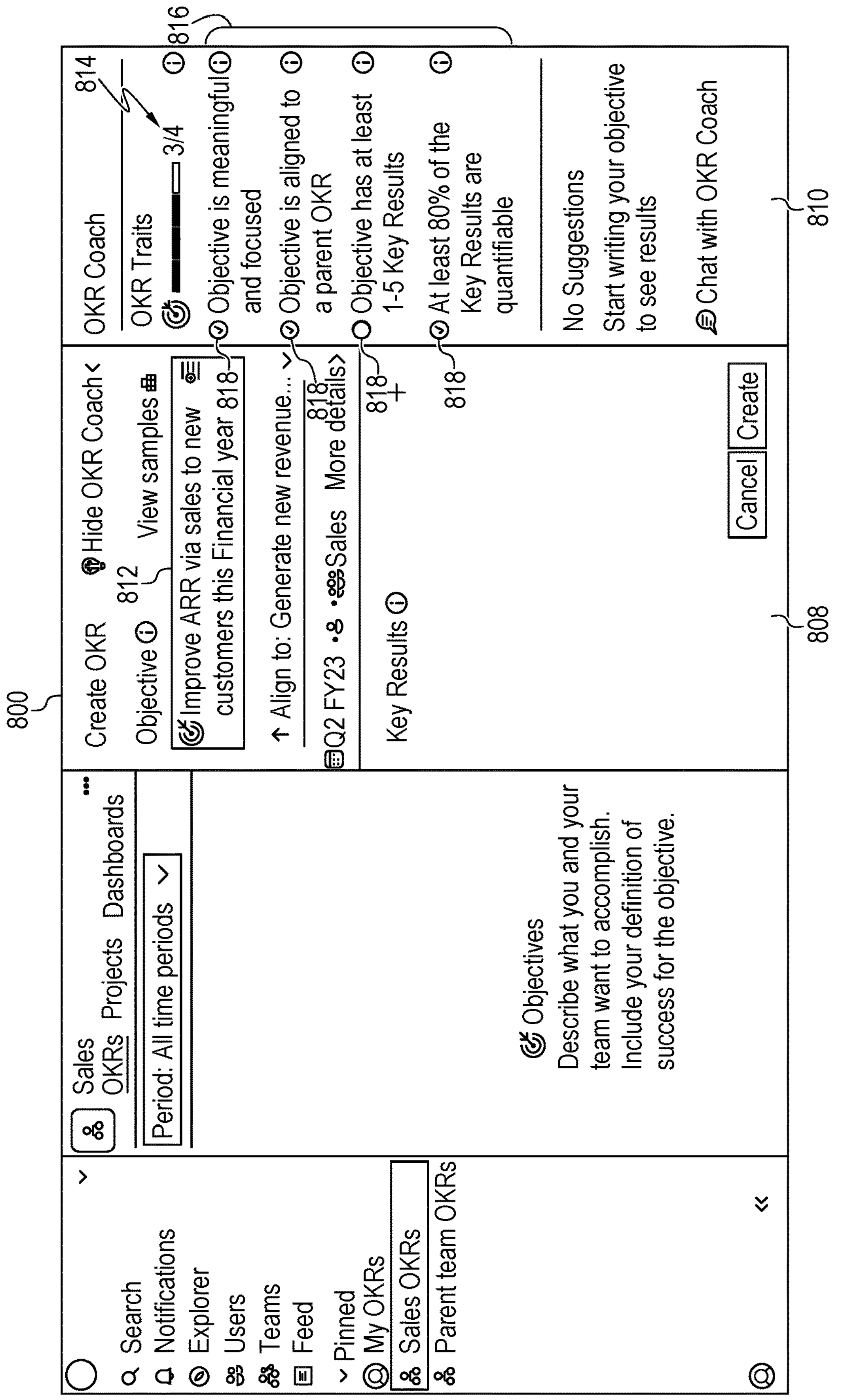
FIG. 8C is a schematic view of the user interface of FIGS. 8A and 8B, in which the OKR creation user interface element and the OKR coach user interface element are updated as the user provides OKR input data.

FIG. 8C is a schematic view of the user interface 800 of FIGS. 8A and 8B, in which the OKR creation user interface element 808 and the OKR coach user interface element 810 are updated as the user provides OKR input data. Specifically, according to the embodiment shown in FIG. 8C, the enterprise user has input "Improve ARR via sales to new customers this Financial Year" into the text field 812 for inputting objective terminology via the OKR creation user interface element 808. Responsive to such user input, the machine-learning-based OKR generation process described herein is executed in real-time, and the OKR coach user interface element 810 surfaces an updated OKR quality score 814 with correspondingly updated indicators 818 showing which OKR traits have been satisfied. In this embodiment, three out of the four OKR traits have been met, with OKR trait (3) (i.e., "Objective has at least 1-5 Key Results") being the only OKR trait that has not been satisfied.

Figure 8D:
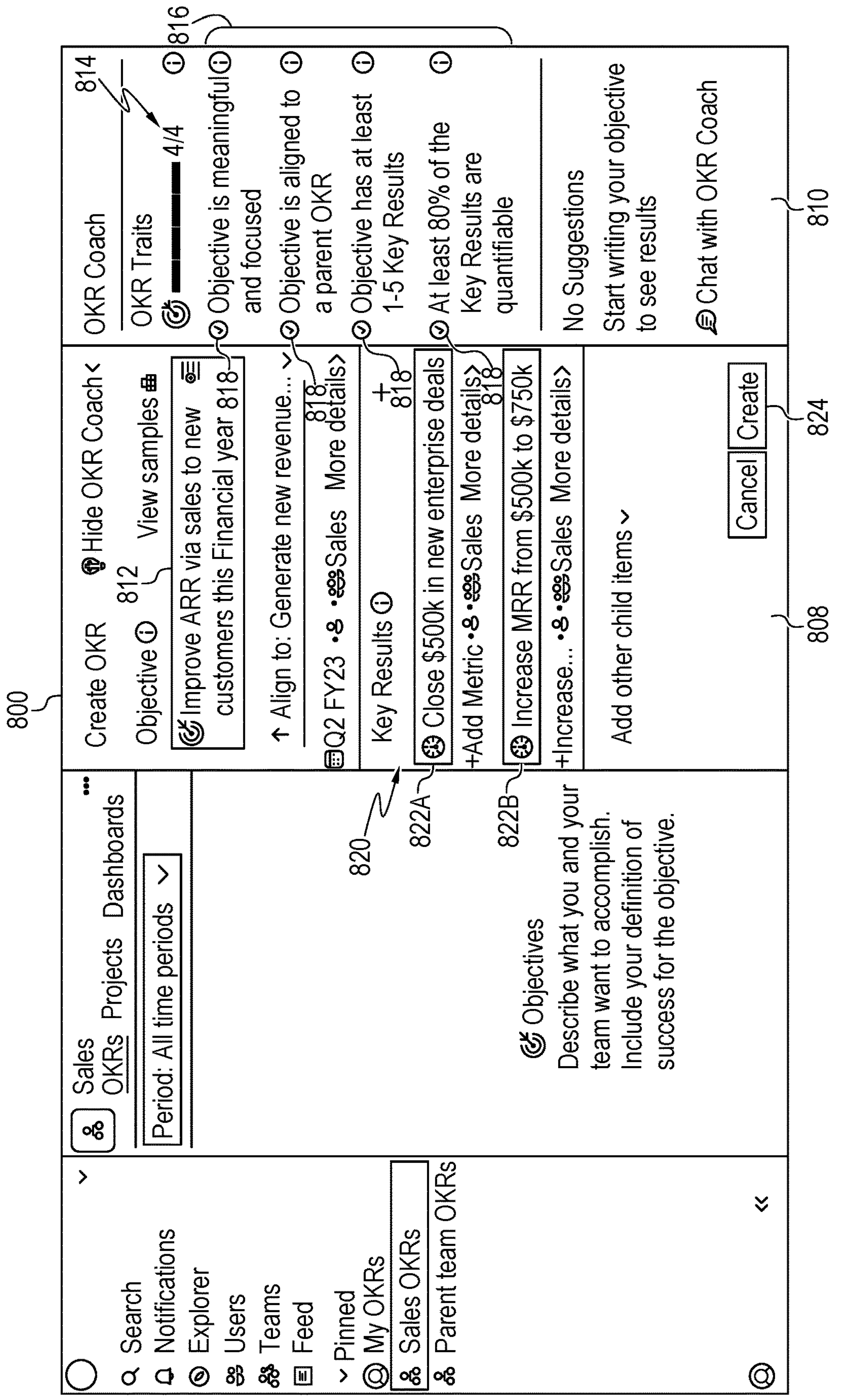
FIG. 8D is a schematic view of the user interface of FIGS. 8A-C, in which the OKR creation user interface element and the OKR coach user interface element are further updated as the user provides additional OKR input data.

FIG. 8D is a schematic view of the user interface 800 of FIGS. 8A-C, in which the OKR creation user interface element 808 and the OKR coach user interface element 810 are further updated as the user provides additional OKR input data. Specifically, according to the embodiment shown in FIG. 8D, a key results section 820 of the OKR creation user interface element 808 has been expanded to provide text fields 822A and 822B that enable the enterprise user to input terminology corresponding to the desired key result(s) (i.e., "Close $500 k in new enterprise deals" and "Increase MRR from $500 k to $750 k" according to the embodiment shown in FIG. 8D). Moreover, responsive to the user specifying such key result(s), the machine-learning-based OKR generation process described herein is executed in real-time, and the OKR coach user interface element 810 surfaces an updated OKR quality score 814 with correspondingly updated indicators 818 showing that all four OKR traits have now been satisfied. As a result, the enterprise user may choose to select a "Create" button 824 (or other similar user interface element) that finalizes the OKR and loads the OKR into the goal-setting feature of the enterprise application.

Figure 9:
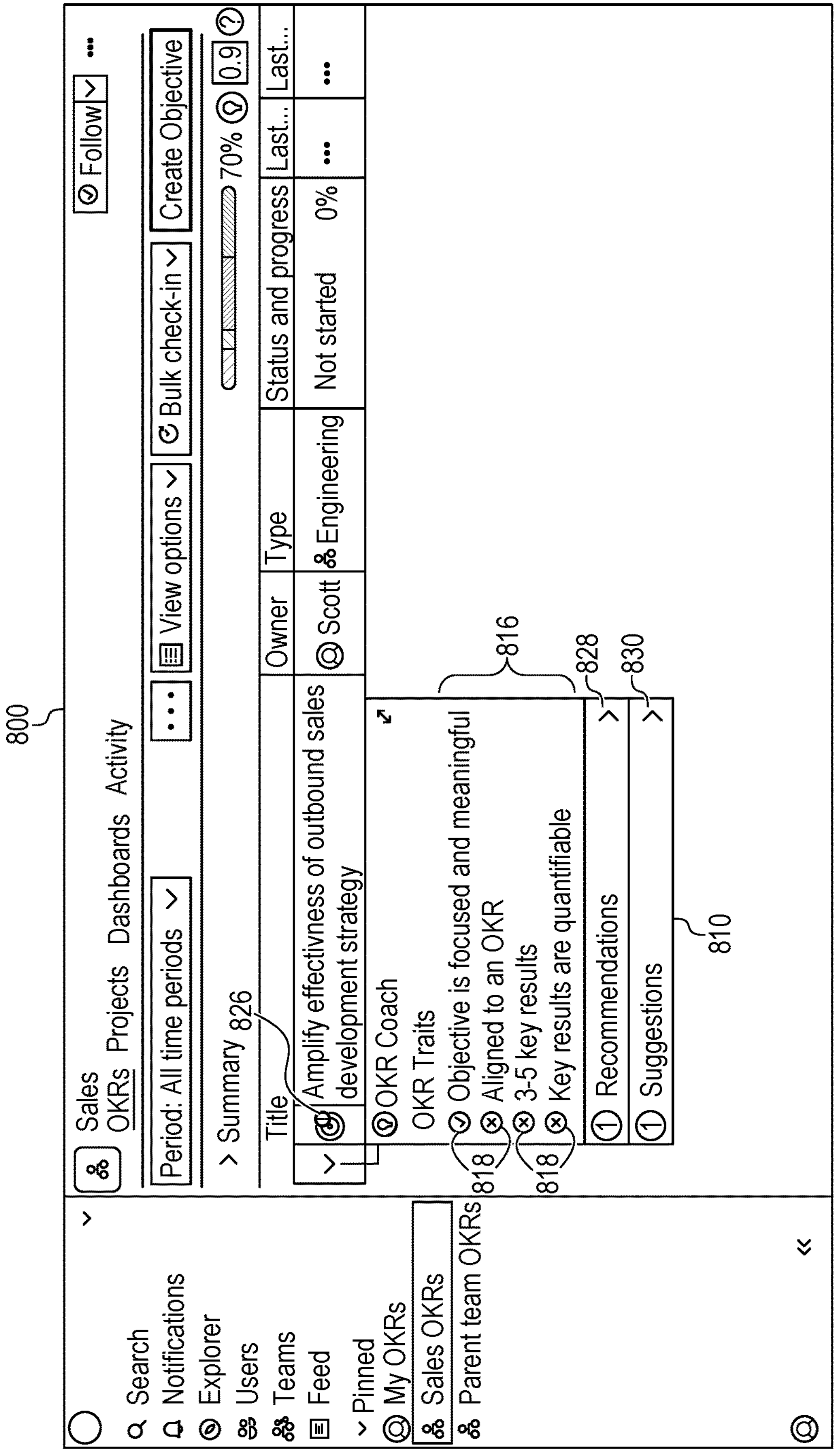
FIG. 9 is a schematic view of the user interface of FIGS. 8A-D for another exemplary implementation in which the OKR coach user interface element is provided as a popover element that is visible upon hover over an Objective icon surfaced on the user interface.

FIG. 9 is a schematic view of the user interface 800 of FIGS. 8A-D for another exemplary implementation in which the OKR coach user interface element 810 is provided as a popover element that is visible upon hover over an Objective icon 826 surfaced on the user interface 800. According to this embodiment, the popover form of the OKR coach user interface element 810 includes the list view 816 of the OKR traits as well as the indicators 818 showing which OKR traits have been satisfied. Moreover, the OKR coach user interface element 810 further includes a Recommendations section 828, which leads to a second-level menu with actionable recommendations for improving the OKR quality such that the objective adheres to the OKR traits, especially the OKR traits that have not yet been satisfied. The OKR coach user interface element 810 also includes a Suggestions section 830, which leads to a second-level menu with actionable suggestions including relevant sample OKRs, for example. In this manner, the OKR coach user interface element 810 enables the enterprise user to easily and seamlessly enhance the OKR quality within the context of the goal-setting feature of the enterprise application.

In various embodiments, the OKR recommendations and/or suggestions provided according to the embodiments described herein may include customized OKR examples that are at least partially geared toward the particular enterprise user's ecosystem (e.g., the user's team, organization, industry, or the like). For example, in such embodiments, enterprise-level data obtained from a property graph maintained by the application service provider may be utilized to provide such customized OKR examples. (One example of this type of property graph is Microsoft® Graph, which is provided by Microsoft Corporation). In this manner, the techniques described herein can be automatically tailored to the particular enterprise user and/or the particular enterprise for which the techniques are being executed.

In some embodiments, the techniques described herein include automatically rewording (or suggesting the rewording of) OKR input data that are provided by the enterprise user to produce objectives and/or key results that meet the desired OKR traits. In such embodiments, this may be performed in real-time (or near real-time) as the enterprise user is typing the objective and/or key result terminology into the corresponding text field.

It should be noted that some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium (or media)" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

The present techniques may be susceptible to various modifications and alternative forms, including (but not limited to) those described in the following examples:

Example 1 is a method for training a machine learning model, where the method is implemented via a computing system including a processor, and where the method includes: generating synthetic data using a generative pretrained transformer bidirectional language model; self-supervising the generated synthetic data based on positive traits including at least one of rule-based criteria or model-based criteria; generating a set of positive synthetic data labels with gradient scale rating based on the self-supervised synthetic data; synthesizing a set of negative synthetic data labels by self-supervising the positive synthetic data labels; and training a machine learning model using the set of positive synthetic data labels and the set of negative synthetic data labels.

Example 2 includes the method of example 1, including or excluding optional features. In this example, synthesizing the set of negative synthetic data labels by self-supervising the positive synthetic data labels includes at least one of: generating permutations of the positive synthetic data labels; or performing data augmentation to modify the positive synthetic data labels.

Example 3 includes the method of example 1 or 2, including or excluding optional features. In this example, the machine learning model includes a transformer-based, self-supervised bidirectional language model.

Example 4 includes the method of any one of examples 1 to 3, including or excluding optional features. In this example, the synthetic data include synthetic Objectives and Key Results (OKR) data; the positive traits correspond to desired OKR traits; and the machine learning model is trained to assess a quality of OKR input data based on adherence to the desired OKR traits.

Example 5 includes the method of any one of examples 1 to 4, including or excluding optional features. In this example, the method includes training the machine learning model using traditional data labels, in addition to the set of positive synthetic data labels and the set of negative synthetic data labels.

Example 6 includes the method of example 5, including or excluding optional features. In this example, the method includes performing at least one of: scraping at least a portion of the traditional data labels from public websites; or generating at least a portion of the traditional data labels from enterprise-level data obtained from a property graph.

Example 7 is a method for generating OKRs for an enterprise, where the method is implemented via a computing system including a processor, and where the method includes: generating synthetic OKR data using a generative pre-trained transformer bidirectional language model; self-supervising the generated synthetic OKR data based on desired OKR traits; generating a set of positive synthetic OKR data labels with a gradient scale rating; synthesizing a set of negative synthetic OKR data labels by self-supervising the positive synthetic OKR data labels; training a machine learning model using the set of positive synthetic OKR data labels and the set of negative synthetic OKR data labels; executing, via a network, an enterprise application on a remote computing system; causing surfacing of a user interface on a display of the remote computing system during the execution of the enterprise application, where the user interface corresponds to a goal-setting feature of the enterprise application; receiving, via the surfaced user interface, text input corresponding to an objective for an OKR; assessing the text input based on the desired OKR traits using the trained machine learning model; and causing surfacing of a user interface element on the user interface, where the user interface element includes an indication of whether the text input satisfies each of the desired OKR traits.

Example 8 includes the method of example 7, including or excluding optional features. In this example, the method further includes receiving, via the surfaced user interface, a modification to the text input; and adapting the surfaced user interface element to update the indication of whether the text input satisfies each of the desired OKR traits.

Example 9 includes the method of example 7 or 8, including or excluding optional features. In this example, the method further includes performing at least one of a spell check operation or a grammar check operation on the text input; and incorporating an output from the at least one of the spell check operation or the grammar check operation into the assessment of the text input based on the desired OKR traits.

Example 10 includes the method of any one of examples 7 to 9, including or excluding optional features. In this example, the method includes surfacing at least one of an actionable suggestions or an actionable recommendation for modifying the text input such that the text input will satisfy at least one desired OKR trait that has not yet been satisfied.

Example 11 includes the method of any one of examples 7 to 10, including or excluding optional features. In this example, the generative pre-trained transformer bidirectional language model includes a generative machine learning chatbot.

Example 12 includes the method of any one of examples 7 to 11, including or excluding optional features. In this example, the machine learning model includes a transformer-based, self-supervised bidirectional language model.

Example 13 includes the method of any one of examples 7 to 12, including or excluding optional features. In this example, the desired OKR traits are defined based on at least one of rule-based criteria or model-based criteria.

Example 14 includes the method of any one of examples 7 to 13, including or excluding optional features. In this example, the method further includes loading the OKR into the goal-setting feature of the enterprise application responsive to the text input satisfying a specified percentage of the desired OKR traits.

Example 15 includes the method of any one of examples 7 to 14, including or excluding optional features. In this example, the method is repeated for text input corresponding to a key result for the OKR.

Example 16 is an application service provider server. The application service provider server includes: a processor; an enterprise application that is utilized by an enterprise; a communication connection for connecting a remote computing system to the application service provider server via a network, where the remote computing system is operated by an enterprise user corresponding to the enterprise; and a computer-readable storage medium operatively coupled to the processor. The computer-readable storage medium includes computer-executable instructions that, when executed by the processor, cause the processor to: generate synthetic Objectives and Key Results (OKR) data using a generative pre-trained transformer bidirectional language model; self-supervise the generated synthetic OKR data based on desired OKR traits including at least one of rule-based criteria or model-based criteria; self-supervise a set of positive synthetic OKR data labels with a gradient scale rating; synthesize a set of negative synthetic OKR data labels by self-supervising the positive synthetic OKR data labels; train a transformer-based, self-supervised bidirectional language model using the set of positive synthetic OKR data labels and the set of negative synthetic OKR data labels; cause execution of the enterprise application on the remote computing system; cause surfacing of a user interface on a display of the remote computing system during the execution of the enterprise application, where the user interface corresponds to a goal-setting feature of the enterprise application; receive, via the surfaced user interface, text input corresponding to an objective for an OKR; assess the text input based on the desired OKR traits using the trained transformer-based, self-supervised bidirectional language model; and cause surfacing of a user interface element on the user interface, where the user interface element includes an indication of whether the text input satisfies each of the desired OKR traits.

Example 17 includes the application service provider server of example 16, including or excluding optional features. In this example, the application service provider server further includes computer-executable instructions that, when executed by the processor, cause the processor to: receive, via the surfaced user interface, a modification to the text input; and adapt the surfaced user interface element to update the indication of whether the text input satisfies each of the desired OKR traits.

Example 18 includes the application service provider server of example 16 or 17, including or excluding optional features. In this example, the application service provider server further includes computer-executable instructions that, when executed by the processor, cause the processor to: perform at least one of a spell check operation or a grammar check operation on the text input; and incorporate an output from the at least one of the spell check operation or the grammar check operation into the assessment of the text input based on the desired OKR traits.

Example 19 includes the application service provider server of any one of examples 16 to 18, including or excluding optional features. In this example, the application service provider server further includes computer-executable instructions that, when executed by the processor, cause the processor to train the transformer-based, self-supervised bidirectional language model using traditional data labels, in addition to the set of positive synthetic OKR data labels and the set of negative synthetic OKR data labels.

Example 20 includes the application service provider server of any one of examples 16 to 19, including or excluding optional features. In this example, the application service provider server further includes computer-executable instructions that, when executed by the processor, cause the processor to synthesize the set of negative synthetic OKR data labels by self-supervising the positive synthetic OKR data labels by performing at least one of: generating permutations of the positive synthetic OKR data labels; or performing data augmentation to modify the positive synthetic OKR data labels.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors, and switches (such as if-then and if-then-else statements), assignments, arithmetic computations, and the like, that, in execution, configure a computing system to operate in accordance with the particular method or process. However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for generating Objectives and Key Results (OKRs) for an enterprise, wherein the method is implemented via a computing system comprising a processor, and wherein the method comprises:

generating synthetic OKR data using a generative pretrained transformer bidirectional language model;

self-supervising the generated synthetic OKR data based on desired OKR traits;

generating a set of positive synthetic OKR data labels with a gradient scale rating;

synthesizing a set of negative synthetic OKR data labels by self-supervising the positive synthetic OKR data labels;

training a machine learning model using the set of positive synthetic OKR data labels and the set of negative synthetic OKR data labels;

executing, via a network, an enterprise application on a remote computing system;

causing surfacing of a user interface on a display of the remote computing system during the execution of the enterprise application, wherein the user interface corresponds to a goal-setting feature of the enterprise application;

receiving, via the surfaced user interface, text input corresponding to an objective for an OKR;

assessing the text input based on the desired OKR traits using the trained machine learning model; and causing surfacing of a user interface element on the user interface, wherein the user interface element comprises an indication of whether the text input satisfies each of the desired OKR traits.

2. The method of claim 1, further comprising:

receiving, via the surfaced user interface, a modification to the text input; and adapting the surfaced user interface element to update the indication of whether the text input satisfies each of the desired OKR traits.

3. The method of claim 1, further comprising:

performing at least one of a spell check operation or a grammar check operation on the text input; and incorporating an output from the at least one of the spell check operation or the grammar check operation into the assessment of the text input based on the desired OKR traits.

4. The method of claim 1, comprising surfacing at least one of an actionable suggestion or an actionable recommendation for modifying the text input such that the text input will satisfy at least one desired OKR trait that has not yet been satisfied.

5. The method of claim 1, wherein the generative pre-trained transformer bidirectional language model comprises a generative machine learning chatbot.

6. The method of claim 1, wherein the machine learning model comprises a transformer-based, self-supervised bidirectional language model.

7. The method of claim 1, wherein the desired OKR traits are defined based on at least one of rule-based criteria or model-based criteria.

8. The method of claim 1, comprising loading the OKR into the goalsetting feature of the enterprise application responsive to the text input satisfying a specified percentage of the desired OKR traits.

9. The method of claim 1, comprising repeating the method for text input corresponding to a key result for the OKR.

10. An application service provider server, comprising:

a processor;

an enterprise application that is utilized by an enterprise;

a communication connection for connecting a remote computing system to the application service provider server via a network, wherein the remote computing system is operated by an enterprise user corresponding to the enterprise; and a computer-readable storage medium operatively coupled to the processor, the computer-readable storage medium comprising computer executable instructions that, when executed by the processor, cause the processor to:

generate synthetic Objectives and Key Results (OKR) data using a generative pre-trained transformer bidirectional language model;

self-supervise the generated synthetic OKR data based on desired OKR traits comprising at least one of rule-based criteria or model-based criteria;

generate a set of positive synthetic OKR data labels with a gradient scale rating;

synthesize a set of negative synthetic OKR data labels by self-supervising the positive synthetic OKR data labels;

train a transformer-based, self-supervised bidirectional language model using the set of positive synthetic OKR data labels and the set of negative synthetic OKR data labels;

cause execution of the enterprise application on the remote computing system;

cause surfacing of a user interface on a display of the remote computing system during the execution of the enterprise application, wherein the user interface corresponds to a goalsetting feature of the enterprise application;

receive, via the surfaced user interface, text input corresponding to an objective for an OKR;

assess the text input based on the desired OKR traits using the trained transformer-based, self-supervised bidirectional language model; and cause surfacing of a user interface element on the user interface, wherein the user interface element comprises an indication of whether the text input satisfies each of the desired OKR traits.

11. The application service provider server of claim 10, further comprising computer-executable instructions that, when executed by the processor, cause the processor to:

receive, via the surfaced user interface, a modification to the text input; and adapt the surfaced user interface element to update the indication of whether the text input satisfies each of the desired OKR traits.

12. The application service provider server of claim 10, further comprising computer-executable instructions that, when executed by the processor, cause the processor to:

perform at least one of a spell check operation or a grammar check operation on the text input; and incorporate an output from the at least one of the spell check operation or the grammar check operation into the assessment of the text input based on the desired OKR traits.

13. The application service provider server of claim 10, further comprising computer-executable instructions that, when executed by the processor, cause the processor to train the transformer-based, self-supervised bidirectional language model using traditional data labels, in addition to the set of positive synthetic OKR data labels and the set of negative synthetic OKR data labels.

14. The application service provider server of claim 10, further comprising computer-executable instructions that, when executed by the processor, cause the processor to synthesize the set of negative synthetic OKR data labels by self-supervising the positive synthetic OKR data labels by performing at least one of:

generating permutations of the positive synthetic OKR data labels; or performing data augmentation to modify the positive synthetic OKR data labels.

15. A computer-readable storage medium having computer-executable instructions stored thereon, which, upon execution by a computer, cause the computer to perform operations including:

generating synthetic OKR data using a generative pre-trained transformer bidirectional language model;

self-supervising the generated synthetic OKR data based on desired OKR traits;

generating a set of positive synthetic OKR data labels with a gradient scale rating;

synthesizing a set of negative synthetic OKR data labels by self-supervising the positive synthetic OKR data labels;

training a machine learning model using the set of positive synthetic OKR data labels and the set of negative synthetic OKR data labels;

executing, via a network, an enterprise application on a remote computing system;

causing surfacing of a user interface on a display of the remote computing system during the execution of the enterprise application, wherein the user interface corresponds to a goal-setting feature of the enterprise application;

receiving, via the surfaced user interface, text input corresponding to an objective for an OKR;

assessing the text input based on the desired OKR traits using the trained machine learning model; and causing surfacing of a user interface element on the user interface, wherein the user interface element comprises an indication of whether the text input satisfies each of the desired OKR traits.

16. The computer-readable storage medium of claim 15, wherein the operations further comprise:

receiving, via the surfaced user interface, a modification to the text input; and adapting the surfaced user interface element to update the indication of whether the text input satisfies each of the desired OKR traits.

17. The computer-readable storage medium of claim 15, wherein the operations further comprise:

performing at least one of a spell check operation or a grammar check operation on the text input; and incorporating an output from the at least one of the spell check operation or the grammar check operation into the assessment of the text input based on the desired OKR traits.

18. The computer-readable storage medium of claim 15, wherein the operations further comprise:

surfacing at least one of an actionable suggestion or an actionable recommendation for modifying the text input such that the text input will satisfy at least one desired OKR trait that has not yet been satisfied.

19. The computer-readable storage medium of claim 15, wherein the generative pre-trained transformer bidirectional language model comprises a generative machine learning chatbot.

20. The computer-readable storage medium of claim 15, wherein the machine learning model comprises a transformer-based, self-supervised bidirectional language model.

* * * * *